(12) United States Patent  
Ferrari et al.

(10) Patent No.: US 7,550,203 B2
(45) Date of Patent: Jun. 23, 2009

(54) COMPARTMENTALIZED RESIN PELLETS

(75) Inventors: Gianluca Ferrari, Venice (IT); Edwin A. Sisson, Medina, OH (US); Ricardo Knudsen, São Paulo (BR)

(73) Assignee: M & G USA Corporation, Apple Grove, WV (US)

( * ) Notice: Subject to any disclaimer, the term of this patent is extended or adjusted under 35 U.S.C. 154(b) by 813 days.

(21) Appl. No.: 11/130,961

(22) Filed: May 17, 2005

(65) Prior Publication Data

US 2005/0261126 A1 Nov. 24, 2005

Related U.S. Application Data

(60) Provisional application No. 60/572,225, filed on May 18, 2004, provisional application No. 60/605,658, filed on Aug. 30, 2004, provisional application No. 60/613,097, filed on Sep. 25, 2004, provisional application No. 60/646,329, filed on Jan. 24, 2005, provisional application No. 60/677,829, filed on May 5, 2005.

(51) Int. Cl.
*B32B 5/66* (2006.01)

(52) U.S. Cl. ............... 428/403; 428/407; 427/212; 425/97; 264/143

(58) Field of Classification Search .......... 428/403, 428/407; 427/212; 264/143; 425/97
See application file for complete search history.

(56) References Cited

U.S. PATENT DOCUMENTS

| | | | |
|---|---|---|---|
| 4,791,965 A | 12/1988 | Wynn | |
| 5,221,580 A | 6/1993 | Amory et al. | |
| 5,464,676 A | 11/1995 | Hoyt | |
| 5,582,913 A | 12/1996 | Simons | |
| 5,627,218 A | 5/1997 | Bradt | |
| 5,747,218 A | 5/1998 | Bradt | |
| 5,747,248 A | 5/1998 | Bradt | |
| 5,747,548 A * | 5/1998 | Bradt | ............... 521/57 |
| 6,344,539 B1 | 2/2002 | Palmer | |
| 6,406,766 B1 * | 6/2002 | Rotter et al. | ............. 428/35.7 |
| 6,669,986 B1 * | 12/2003 | Mushiake et al. | ........... 427/214 |

FOREIGN PATENT DOCUMENTS

| | | |
|---|---|---|
| EP | 1236790 | 9/2002 |
| JP | 59081121 | 5/1984 |
| JP | 2000351117 | 12/2000 |

* cited by examiner

*Primary Examiner*—Leszek Kiliman
(74) *Attorney, Agent, or Firm*—Edwin A. Sisson, Attorney at Law, LLC

(57) ABSTRACT

This invention discloses a process and a necessary article to simultaneously thermally treat at least two thermoplastics. The process utilizes the necessary compartmentalized or zoned pellet construction wherein the major amount of each thermoplastic component is located within individual compartments or zones of the pellet such that the components of the reaction during thermal processing and/or reactions with compounds in the atmosphere such as oxygen are less than the reaction if the thermoplastics were homogeneously dispersed in the pellet. This invention allows the components of the multi-component pellets to be thermally treated together without significant degradation and/or stored in air or in the presence of oxygen without significant degradation.

168 Claims, 2 Drawing Sheets

COMPARTMENTALIZED RESIN PELLETS

This patent application claims the benefit of the priority of U.S. Provisional Patent Application Ser. No. 60/572,225 filed May 18, 2004; U.S. Provisional Patent Application Ser. No. 60/605,658 filed Aug. 30, 2004; U.S. Provisional Patent Application Ser. No. 60/613,097 filed Sep. 25, 2004; U.S. Provisional Patent Application Ser. No. 60/646,329 filed Jan. 24, 2005, and U.S. Provisional Application Ser. No. 60/677,829 filed May 5, 2005. The teachings of these provisional patent applications are incorporated herein by reference.

FIELD OF THE INVENTION

This invention relates to resin pellets that are comprised of at least two compartmentalized zones.

BACKGROUND OF THE INVENTION

Many industrial articles are comprised of multiple components to economically improve their properties. Multi-component articles made from thermoplastic and thermoset materials are generally manufactured with a final melt-mixing extruder that homogenously combines the various components into an article such as a sheet, film, fiber, a bottle or an injection molded part, frequently called a preform. The article, particularly the preform, is often further processed to make another article such as a bottle, tray, jar, or bag.

As packaging demands become more complex, multiple components are needed to increase the functional properties of the package. Barrier to vapor or specific compounds such as oxygen is one of the more important of these properties. Oxygen barrier materials are expensive and it is therefore desirable to minimize their cost in the final package.

Reduced rates of oxygen transmission can be achieved using passive or active barrier techniques. Passive barrier techniques reduce the transmission rate of the vapor or liquid into the package. By contrast, active barrier techniques incorporate material(s) into the wall of the package that react(s) with the vapor or liquid of concern and thus prevents their passage through the container wall.

Current packages integrate the passive barrier material into a separate layer in the wall of the container. This is accomplished by using one extruder to melt a major component and form the article while a second extruder melts the barrier material and injects the barrier material in a separate layer of the article that forms the wall of the container. U.S. Pat. No. 4,501,781, for example, describes improving passive barrier properties by incorporating a polyamide layer and a polyester layer to make a multi-layer container. U.S. Pat. No. 4,501,781 also teaches that the polyamide can be homogeneously blended with the polyester in the container wall as opposed to the polyamide being placed in a separate layer.

As contemplated by U.S. Pat. No. 5,340,884, the polyamide may be blended with the polyester during the later stages of polyester manufacture. For example, the polyamide can be blended with the molten polyester as it is removed from the polycondensation reactor to create a homogenously blend in a single pellet. As noted in U.S. Pat. No. 5,340,884, blending with the molten polyester as it is removed from the polycondensation reactor is not desirable if the polyester/polyamide blend will be subjected to further thermal processing such as solid state polymerization since undesirable color and/or haze may develop during extended time at elevated temperatures. There exists therefore, to the need for a process which allows the pellet containing polyester and polyamide to be crystallized and/or solid phase polymerized without detrimental impact on the properties of either material.

The active barrier technique, as described in U.S. Pat. No. 5,021,515, involves the reaction of a component in the wall of a container with oxygen. Such a reaction has come to be known as oxygen scavenging. U.S. Pat. Nos. 5,021,515, 5,049,624, and 5,639,815 disclose packaging materials and processes utilizing polymer compositions capable of scavenging oxygen; such compositions include an oxidizable organic polymer component, preferably a polyamide (more preferably m-xylylene adipamide, commonly referred to as MXD6) and a metal oxidation promoter (such as a cobalt compound).

U.S. Pat. No. 5,529,833 describes a composition comprising an ethylenically unsaturated hydrocarbon oxygen scavenger catalyzed by a promoter such as a transition metal catalyst and a chloride, acetate, stearate, palmitate, 2-ethylhexanoate, neodecanoate or naphthenate counterion. Preferred metal salts are selected from cobalt (II) 2-ethylhexanoate and cobalt (II) neodecanoate.

U.S. Pat. Nos. 6,406,766, 6,558,762, 6,346,308, 6,365,247, and 6,083,585 teach to functionalize the oxidizable component such as a polybutadiene oligomer and react it into the backbone of the major polymer matrix, such as polyethylene terephthalate (PET). Such a composition may be incorporated into the wall of the container as a separate layer of the container wall or comprise the entire wall.

Elemental or reduced metal scavengers are other active barrier techniques. These metals, usually in the presence of a promoter such as sodium chloride, are not reactive with oxygen until exposed to moisture that triggers the reaction. The advantage of the metal scavenger is that a pellet containing a metal based scavenger will not react with oxygen unless placed in contact with moisture, a component that is external to the pellet. The use of an agent external to the pellet composition to initiate the reaction makes this a triggerable system. This is in stark contrast to the previously discussed organic systems which are active when the ingredients are combined to make the container or pellet. It is noted that there are some oxygen reactive compounds that have both an inherent reactivity with oxygen and also have a promotable and/or a triggerable reactivity as well.

The traditional technique of making a multi-component article with a passive barrier material introduces the individual components to the throat of a single final melt-mixing extruder to achieve a homogeneous mixture. Oftentimes the components are incompatible, meaning they form at least two phases, and form dispersions of the minor components in the major component. In the case where the components are soluble and thus compatible with each other, the minor components are absorbed into a major component creating a single phase. Sometimes, the components interact or interreact with each other, such as the case with thermoset articles.

U.S. Pat. No. 5,627,218 characterizes interactive/interreactive reactions as those reactions which upon melt mixing, the interreactions of the contained materials begins. The interactive/interreactive reactions are further characterized by U.S. Pat. No. 5,627,218 as reactions where "the reaction times of the pellet contained reactants is generally long in comparison to the time required for the molding or extrusion process. The resulting increase of molecular size and linkage complexity enhances physical properties and largely takes place after the material is formed into the final shape. Post-molding cure can be allowed to take place slowly or an oven cure can be affected at any time."

The traditional technique of feeding the components at the throat of the final melt-mixing extrusion step is very expensive. Each component must be precisely added at each extruder. This creates multiple handling and feeding systems for each extruder. It is therefore desirable to provide a single feed stream at the extruder with a single feed stream containing the properly metered amounts of the various components within each pellet.

One solution to the metering problem is to pre-compound the components with a larger more economical extruder and supply the pre-compounded material to the numerous final melt mixing extruders manufacturing the article. While pre-compounding achieves some economies of scale it adds additional processing steps.

Another technique pre-compounds and concentrates the minor components of the article into a masterbatch or concentrate of feed pellets wherein the minor components of the article are present in much higher levels than those of the final article. In fact, the minor component of the finished article may actually be present in the masterbatch at a level higher than the major component of the finished article. The concentrate is then physically blended with pellets consisting essentially of the major component. The physical blend is done in ratios which create the desired ratio of the components in the finished article. The physical blend can then be added to the final melt mixing extruder as a single feed. Alternatively, the concentrate and major component can be added to the final melt-mixing extruder as two feeds. This reduces the number of feed streams and metering errors when the amounts of the minor component(s) are very small in the final article.

The masterbatch approach still suffers from having more than one feed to the final melt mixing extruder. Also, pre-compounding fails when the pre-compounded pellet requires additional processing prior to the final melt mixing step. Often, subsequent processing, such as exposure to heat, generates and releases compounds from one component that degrades another component and comprising the properties. These compounds can be classified as the by-products of thermal processing.

A by-product of thermal processing is a compound contained in the component and released during thermal processing, produced during thermal processing or both. The release of a by-product of thermal processing means that the compound (by-product) is released or stripped away from the component during thermal processing.

Once released from the first component, the by-product contacts and reacts with the second component or a by-product of the second component to create a negative attribute such as an unwanted color shift, odor, or gas. By-products of thermal processing are not limited to the reaction products but may be unreacted monomer, low molecular weight oligomers, decomposing stabilizers, catalysts or other additives which are released during thermal processing.

Polyester-polyamide blends are representative of such systems. Polyesters and polyamides are both extremely hydroscopic. The presence of moisture in the liquid phase hydrolyzes the polymer chain, reduces molecular weight and compromises polymer strength. Therefore, both must be dried prior to final melt mixing immediately prior to molding the article. When stored under standard conditions, such as those typically experienced under warehouse conditions (e.g. 50% R.H., >25° C., Air) the polyester and polyamide can absorb moisture to levels which are greatly over commercially acceptable limits (>1,000 ppm). Industrial practice is to dry the compounds to less than 50 ppm moisture. After pre-compounding, the polyester-polyamide pellets are crystallized and then transported to the final melt mixing extruder. The polyester-polyamide pellets must be dried immediately prior to addition to the melt-mixing extruder. This drying operation will typically remove at least 50% of the moisture contained in the compound prior to the thermal drying step. Drying the polyester in the presence of a polyamide creates a highly colored material. Discoloration in the final article occurs both when the pellets of homogenously mixed polyester and polyamide are dried and then extruded into the final article as well as when the separated polyester pellets are dried in the presence of polyamide pellets and then extruded into the final article.

Drying under nitrogen does not alleviate the problem because the by-products generated from the components during nitrogen drying are the same by-products generated during drying in hot air. It is believed that polyester generates by-products, such as acetaldehyde, during thermal processing which is removed during the drying process. Brandi and Schraldi (Polymer Preprints 2004 45 (1), 992) indicates that the yellow color brought on by drying is created by the reaction of acetaldehyde generated from the polyester with the amino end groups of the polyamide.

The color shift of the polyester-polyamide system is exacerbated in industrial applications where the dryer contains a regenerative bed that removes the water from the air and recirculates the water-free air containing the acetaldehyde and other materials. While moisture is removed from recirculated air, the acetaldehyde and other materials remain and are recirculated with the water-free air, further intensifying the problem. Use of a masterbatch has little or no impact upon the problem. It is believed that the finely dispersed polyamide particles have a large surface area with which to react with the by-products generated during the drying process. It is also unclear whether the color comes from more than one reaction, such as one with acetaldehyde followed by a subsequent reaction with oxygen.

Solid phase polymerization efficiently increases the molecular weight, as measured by intrinsic viscosity of both polyesters and polyamides. In the solid phase polymerization process the pellets are exposed to temperatures less than the temperature at which the pellets become liquid. This temperature exposure occurs in the presence of a driving force such as an inert gas or vacuum. The by-products of the polymerization reaction are removed from the pellet thus forcing an equilibrium increase in the molecular weight of the polymer. Because the polyester and polyamide are both pelletized during manufacture, U.S. Pat. No. 5,340,884 advocates combining them at the point where one or the other pellet is cut during its original manufacture. Combining the polyester and polyamide where one or the other is cut into pellets eliminates a subsequent extrusion and cutting step. However, combining the polyester and polyamide at the first cutting step requires that the subsequent polyester-polyamide multi-component pellet be subjected to and survive the thermal processing steps of crystallization, solid phase polymerization and drying. These thermal processing steps can occur from 40° C. to a temperature slightly less than the temperature at which the pellet becomes liquid, such as 1° C., or for more typically for commercial reasons, 5° C. below the temperature at which the pellet becomes liquid.

While U.S. Pat. No. 5,340,884 advocates combining the polyester and polyamide at the first cutting step, it notes and the examples below demonstrate, that homogenously dispersed combinations of the polyamide and polyester in masterbatches, concentrates and pre-compounds cannot be exposed to solid phase polymerization conditions without destroying the molecular weight of the polyamide and bringing on dramatic color shifts. U.S. Pat. No. 5,340,884 minimizes this by using a pre-compounded polyamide concentrate to be blended with the polyester. While a pre-compounded concentrate may reduce some of the effects of subsequent thermal processing, it is not very effective. The polyamide-polyester concentrate suffers the same problem as the separate polyester polyamide pellets dried together.

In a crystallization process, the material in the pellet moves from being substantially amorphous to crystalline. Polymer pellets are usually amorphous but will crystallize when subjected to heat and time. Crystallinity is often expressed as percent crystallinity and is often interpolated by dividing the difference between the density of the material and the amorphous density of the material by the difference between the 100% crystalline density and the amorphous density (0% crystallinity). For polyethylene terephthalate or the polyethylene terephthalate copolymer, the amorphous density is 1.335 gm/cm$^3$, the crystalline density is 1.455 gm/cm$^3$ and the expression therefore for a given sample is:

(Ds−1.335)/(1.455-1.335), where Ds is density of the sample in gm/cm $^3$.

Crystallinity levels can also be determined by differential scanning calorimetry (DSC or D.S.C.) which relates the amount of heat required to melt the material to the amount of heat required to melt a sample of 100% crystallinity.

Pre-compounding oxygen reactive components into a pellet suffers the same limitations as the polyester-polyamide blend. Pre-compounding of oxygen reactive pellets is particularly expensive because the pre-compounded pellets are reactive with oxygen and must be stored and transported in the absence of oxygen. Oxygen reactive pellets are therefore packaged in the absence of oxygen under nitrogen into sealed foil bags.

Additionally, the pre-compounded oxygen reactive pellet does not work for post thermal treatments, such as drying. A pre-compound of a polyester and an oxygen reactive material must be dried prior to final melt mixing. Thus, the pellets must be able to withstand the drying process. Drying with hot air significantly depletes the capacity of the oxygen reactive material to consume oxygen.

U.S. Pat. No. 6,406,766 teaches that post polymerization processes such as drying, devolatilization, crystallization, and solid state polymerization diminish the oxygen scavenging capability and teaches that the loss of oxygen scavenging activity can be minimized by performing such operations in the strict absence of oxygen and limiting the copolymer's exposure to oxygen after such operations.

In spite of its limitations, the current industrial approach pre-compounds an oxygen sensitive material with a promoter/catalyst in a masterbatch containing the major component of the finished article to create an oxygen reactive material, ships the oxygen reactive material in foil bags and subsequently dries the masterbatch in the presence of nitrogen or vacuum just prior to addition into the final melt mixing extrusion process.

One alternative utilizes separate pellets: one pellet containing the oxygen sensitive component and the other pellet containing the major component and the promoter. Several problems are created by this alternative. First, accurate metering of the components is difficult because of stratification caused by various specific gravity and electrostatic properties of the pellets. Second, pre-compounding the oxygen sensitive component with the other components and adding the promoter/catalyst during the final melt mixing step may eliminate storage costs but reintroduces the metering difficulties and separate feed systems.

U.S. Pat. No. 5,627,218, and U.S. Pat. No. 5,747,548 describe a compartmentalized (zoned) pellet wherein interactive or interreactive components are kept in separate compartments or zones of the pellet until the final melt mixing step. Interactive/interreactive components are chemical reactants which are thermally activated to participate in a chemical reaction upon utilization of the pellet in a molding operation. The type of reaction classified as interactive or interreactive are those components that have reactions which must be carried to completion so that the products can be standardized and macromolecular growth limited during molding to prevent the product from becoming too stiff to mold. By contrast, the compartmentalized pellet composition of U.S. Pat. No. 5,627,218 utilizes the slowness of reactions to permit easy mold fill before the reaction converts easy flow materials into less easy flow materials. The reaction rates of the interreactive/interactive compounds are almost universally slow. Upon melt mixing, the interreactions of the contained materials begin. The reaction times of the pellet contained reactants is generally long in comparison to the time required for the molding or extrusion process. The resulting increase of molecular size and linkage complexity enhances physical properties and largely takes place after the material is formed into final shape. Post molding cure can be allowed to take place slowly or an oven cure can be affected at any time.

Reactive extrusion processing is typical of thermosets. While in theory some polyester-polyamides may slightly react in what is known as trans-amination, the reaction would be very rapid and would certainly not build molecular weight or increase viscosity, nor would it continue after the melt-extrusion step. It is known that polyethylene terephthalate does not react with poly m-xylylene adipamide, MXD6.

U.S. Pat. Nos. 5,627,218 and 5,747,548 teach that the compartmentalized pellets contain one or more chemical reactants which are thermally activated to participate in a chemical reaction upon utilization of the pellets in a molding operation. Catalysts which enhance the reaction may also be included. In addition to at least two chemical reactants, the patents also contemplate non-chemically reactive additives such as reinforcing fibers, colors, lubricants and the like.

By keeping the interactive/interreactive components separate until melt mixing, a single pellet is used and the complicated feeding systems associated with the final melt-mixing step are avoided. Neither U.S. Pat. No. 5,627,21 & nor U.S. Pat. No. 5,747,548 contemplates or discloses the use of a compartmentalized pellet when the reaction is with the thermal processing by-product of another component or with a compound external to the pellet, such as oxygen.

U.S. Pat. No. 6,669,986 discloses the use of the compartmentalized pellet to aid in the drying of non-crystallizable polyesters by surrounding them with a crystallizable polyester to prevent blocking or sticking. To accomplish this, U.S. Pat. No. 6,669,986 teaches that the components must be chemically similar to overcome to have utility upon subsequent melt processing. U.S. Pat. No. 6,669,986 neither discloses nor contemplates using the compartmentalized pellet to protect the products from a chemical reaction, in particular the reaction with thermal processing by-products or the reaction with an external compound such as the oxygen in air.

U.S. Pat. No. 6,669,986 also discloses protecting the ingredients of the pellet from water when the water triggers the reaction of a metal based oxygen scavenger. As discussed earlier, this is protection from a triggering mechanism and does not disclose protection from reacting with a compound or when promoter is within the pellet. However, U.S. Pat. No. 6,669,986 does not teach protection of the components from reacting with oxygen or by-products of other components.

U.S. Pat. Nos. 5,747,548 and 6,669,986 both describe how to make such compartmentalized or zoned pellets. Examples of compositions not contemplated by the prior art are those pellet compositions where at least one component reacts with by-products of the other component, where such by-products are the product of further processing such as thermal processing or when at least one of the components reacts with compounds in the environment such as the oxygen found in air.

SUMMARY OF THE INVENTION

The present invention relates to a process and necessary articles to simultaneously thermally process at least two compounds when one of the compounds reacts to a by-product of thermal processing or a compound in the surrounding environment. The process involves creating a pellet of distinct regions wherein the components are placed in the regions so as to control the degradation of the compounds in the pellet during subsequent processing steps including storing the pellets in an oxygen containing environment such as air. Specifically, the pellet construction allows the materials to be thermally treated and minimizes or prevents chemical reactions with by-products created during thermal processing, minimizes or prevents the reaction of components in the pellet with ambient compounds, such as the oxygen, that occur in air, and controls the increase in the molecular weight of one compound with respect to another.

The present invention more specifically discloses a resin pellet comprising an oxygen sensitive component, an oxygen inert component and a reaction promoter wherein the oxygen sensitive component is present in a first compartmentalized zone, and wherein the oxygen inert component is present in a second compartmentalized zone.

The subject invention further reveals a resin pellet comprising an oxygen reactive component and an oxygen inert component, wherein the oxygen reactive component is present in a first compartmentalized zone, and wherein the oxygen inert component is present in a second compartmentalized zone.

The subject invention further reveals a resin pellet comprising a first component and a second component wherein the first component releases a by-product during thermal processing that is reactive with either the second component and/or a by-product released by the second component, and wherein the first component is present in a first compartmentalized zone and wherein the second component is present in a second compartmentalized zone.

The subject invention further reveals a resin pellet which is comprised of a first compartmentalized zone and a second compartmentalized zone, wherein the first compartmentalized zone is comprised of a thermoplastic polyester, and the second compartmentalized zone is comprised of a polyamide, wherein the first compartmentalized zone represents at least 0.1 percent of the total volume of the resin pellet, and wherein the second compartmentalized zone represents at least 0.1 percent of the total volume of the resin pellet.

The subject invention further reveals a resin pellet comprising a first component and a second component wherein the first component is selected from the group consisting of an oxygen sensitive compound, an oxygen reactive compound, an oxygen inert compound, a reaction promoter; a compound which releases a by-product during thermal processing that is reactive with either the second component and/or a by-product released by the second component, and a second component which is different from the first component and which is selected from the group consisting of an oxygen sensitive compound, an oxygen reactive compound, an oxygen inert compound, a reaction promoter, a compound which releases a by-product during thermal processing that is reactive with either the first component and/or a by-product released by the first component and wherein the first component is present in a first compartmentalized zone and wherein the second component is present in a second compartmentalized zone.

The subject invention further reveals a process for thermally treating a resin pellet comprising a first component and a second component wherein the first component is selected from the group consisting of an oxygen sensitive compound, an oxygen reactive compound, an oxygen inert compound, a reaction promoter; a compound which releases a by-product during thermal processing that is reactive with either the second component and/or a by-product released by the second component, and a second component which is different from the first component and which is selected from the group consisting of an oxygen sensitive compound, an oxygen reactive compound, an oxygen inert compound, a reaction promoter, a compound which releases a by-product during thermal processing that is reactive with either the first component and/or a by-product released by the first component and wherein the first component is present in a first compartmentalized zone and wherein the second component is present in a second compartmentalized zone comprising heating the resin pellet to a temperature which is within the range of 40° C. to a temperature which is at least 1° C. below the temperature at which the pellet becomes liquid.

DETAILED DESCRIPTION OF THE INVENTION

Figure 1:
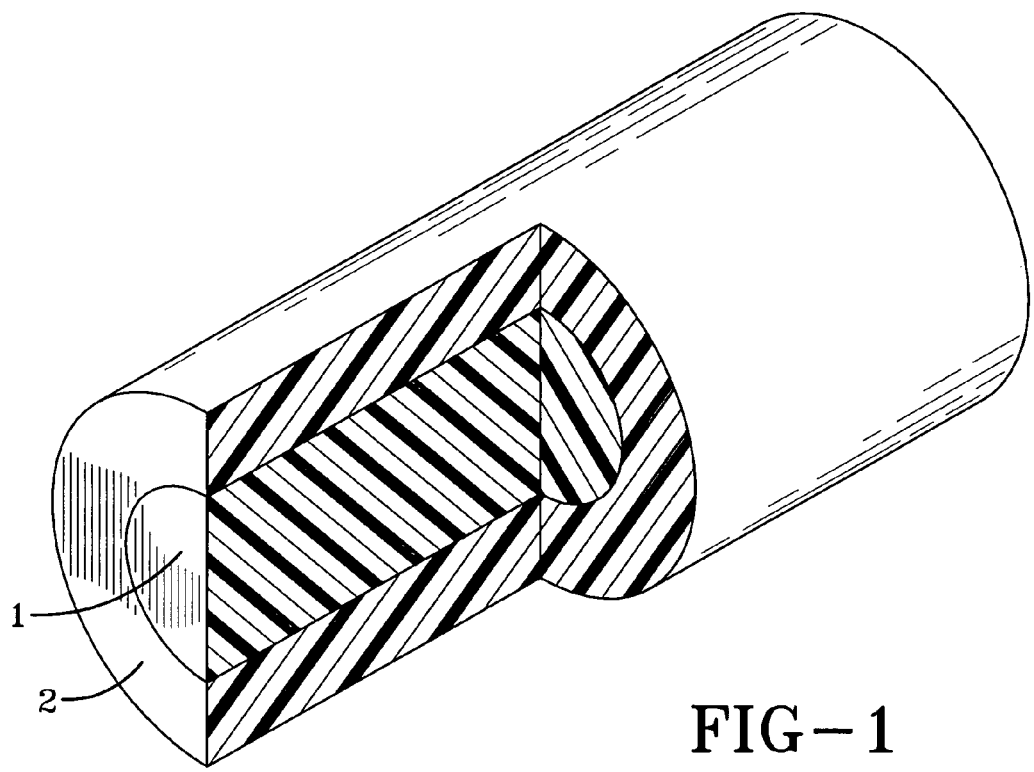
FIG. 1 depicts a resin pellet with two compartments or zones in the core-sheath configuration.

One benefit of the invention is directed toward thermally processing compositions wherein at least one compound generates and releases a by-product(s) during thermal processing that impact(s) the properties of the final composition. By placing the components into separate compartments, the reaction with the generated by-products is minimized.

It is a further benefit of the present invention to allow oxygen reactive systems to undergo subsequent post thermal treatment operations such as drying, devolatilization, crystallization, solid state polymerization and storage in an oxygen environment such as air.

Drying, crystallization and solid phase polymerization are thermal processes that benefit from this invention. The thermal processing envisaged in this invention occurs below the temperature at which the pellet's contents become sufficiently liquid so as to cause the zones to intermingle. Heating the pellet until all the thermoplastic components in the pellet are liquid is known as extrusion processing. Although extrusion processing is a type of thermal processing, it is not the type of thermal processing practiced in accordance with this invention and is therefore excluded. As used herein, therefore, the phrase "rapidly heating the pellet so that a sufficient amount of the pellet's contents become liquid such that the zones intermingle" is not a thermal treatment envisioned for the invention.

A special embodiment of the invention is an inner compartment encapsulated by an outer compartment. It should be understood that in such an embodiment, the temperature exposure may melt or liquefy the material in the encapsulated core without melting the skin surrounding the core. This pellet with a liquefied inner compartment and solid skin is not considered a liquid pellet.

The following embodiments demonstrate that the problems of the by-product reaction associated with thermal processing as defined in this application and the reaction with oxygen during storage can be significantly reduced, if not eliminated, through proper placement of the components into zones or compartments of a pellet with compartmentalized or zoned construction. In one embodiment, the compartmentalized pellet minimizes the exposure of the various components to the by-products of thermal processing. In another embodiment, the oxygen sensitive components are kept unreactive with external materials such as oxygen until final melt mixing. In a third embodiment the oxygen inert component surrounds the oxygen reactive component and prevents oxygen from reaching the oxygen reactive component.

In a fourth embodiment, the by-product sensitive component is surrounded by a compound which is chemically similar to the material producing the by-product, but the surrounding material does not produce the by-product. This pellet is then placed with pellets of the material producing the by-product and thermally processed. A variation of the fourth embodiment is when the chemically similar material is placed between the by-product reactive material and the material producing the by-product.

A fifth embodiment is an additive compartmentalized pellet with a high concentration of one component surrounded by a protective layer of the other component. For example, a pellet of 95% polyamide core zone surrounded by 5% polyester sheath zone could be used. This pellet could be subjected to all the thermal processes with the polyester pellets or it could be added at the dryer feeding the extruder.

A sixth embodiment places at least one acetaldehyde scavenger into the pellet and keeps the scavenger essentially away from the acetaldehyde generated and removed during thermal processing. After thermal processing, the scavenger is dispersed into the polymer during the final melt-mixing extrusion and scavenges the residual acetaldehyde left over from solid phase polymerization and the acetaldehyde generated during the melt extrusion step. More reactant or catalyst would be needed for a homogeneously dispersed pellet. This is due to the fact that the acetaldehyde content of the polyester is very high immediately following the melt polymerization step.

U.S. Pat. Nos. 5,258,233, 5,340,884, and 5,650,469, the teachings of which are incorporated herein by reference, teach the use of a polyamide to react with and scavenge acetaldehyde from the polyester polymer. It will therefore become evident to one skilled in the art that while the detailed description of the invention utilizes polyester and polyamide, the polyamide could be replaced with any compound which reacts with or catalyzes the reaction of acetaldehyde. For example, U.S. Pat. No. 6,274,212, the teachings of which are incorporated herein by reference, teaches the use of heteroatom-containing organic scavengers that react with acetaldehyde to form unbridged 5- or 6-member rings, with anthranilamide being the preferred scavenger. U.S. Pat. No. 6,569,479 teaches the use of catalysts to initiate the reaction of acetaldehyde with oxygen. Other examples of compounds used to reduce the acetaldehyde are active oxidation catalysts that catalyze the reaction of acetaldehyde with oxygen, and hydride-transfer catalysts that catalyze a hydride-transfer reaction between an organic donor molecule, acetaldehyde, 1,8-diaminonaphthalene, 3,4-diaminobenzoic acid, anthranilamide, biuret, malonamide, allantoin, salicyclamide, salicylanilide, o-phenylenediamine, 3,4-diaminobenzoic acid, 1,8-diaminonaphthalene, o-mercaptobenzamide, N-acetylglycinamide, malonamide, 3-mercapto-1,2-propanediol, 4-amino-3-hydroxybenzoic acid, 4,5-dihydroxy-2,7-naphthalenedisulfonic acid disodium salt, biuret, 2,3-diaminopyridine, 1,2-diaminoanthraquinone, dianilinoethane, allantoin, 2-aminobenzenesulfonamide, and 2-amino-2-methyl-1,3-propanediol or an active oxidation catalyst selected from the group consisting of cobalt salt, manganese salt, and a compound comprising an amine, a phosphine or an alcohol complexed with a variable valent metal. The hydride transfer catalyst can be selected from the group consisting of hydrous zirconium oxide, hydrous niobium oxide, and hydrous tantalum oxide.

It is specifically noted that this effect is applicable to compounds which react with acetaldehyde and those compounds which catalyze the reduction of acetaldehyde. Therefore the phrase acetaldehyde scavenger refers to the compound that reacts directly with acetaldehyde or a compound that catalyzes the reaction of acetaldehyde with another compound. Some of these compounds are described in U.S. Patent Application 2005/0014929, titled "Method to Decrease the Aldehyde Content of Polyesters", the teachings of which are incorporated herein by reference. One compound listed is zirconium oxide. Examples of commercially available acetaldehyde scavengers are anthanilic acid amide (Colormatrix Corporation, Cleveland, Ohio USA) and bis(2,4-dicumylphenyl)pentaerythritol Diphosphite (Clariant Corporation, Cesa-nox NTA0050113). A seventh embodiment is to surround the material reactive to the by-product with a material that does not produce the by-product. This structure could be a polyamide surrounded by poly-neopentyl-terephthalate. This pellet would be blended with pellets of polyethylene terephthalate and the mixture subsequently simultaneously thermally processed. Alternatively, a structure having 3 compartmentalized zones having a core 41 which is comprised of a polyamide wherein the core is encased by an intermediate layer 42 which is comprised of poly-neopentyl-terephthalate, which is in turn surrounded by an outer layer 43 which is comprised polyethylene terephthalate can also be used.

The following demonstrates how the compartmentalized pellet structure overcomes the problems of simultaneously thermally processing two or more components when at least one component reacts with the by-product of the other component. Thermal processing is the exposure of the pellet to a temperature greater than 70° C., with or without air or inert gas, such as in a vacuum, but at temperatures less than which the pellet melts. It should be noted that this temperature may be greater than the melt point of one of the polymers when that polymer is encapsulated by a skin of a polymer with a higher melt point. Drying, crystallization, devolatilization and solid phase polymerization, also known as solid state polymerization, as discussed below, are examples of such thermal processing.

U.S. Pat. Nos. 5,627,218 and 5,747,548, the teachings of which are herein incorporated by reference, teach many techniques for manufacturing compartmentalized pellets. In one embodiment, there are at least two zones, or regions in the pellet, preferably a core and a sheath. Unless otherwise noted, the core-sheath with the sealed ends, as taught by U.S. Pat. No. 6,669,986, the teachings of which are herein incorporated by reference, is the preferred pellet structure.

Figure 4:
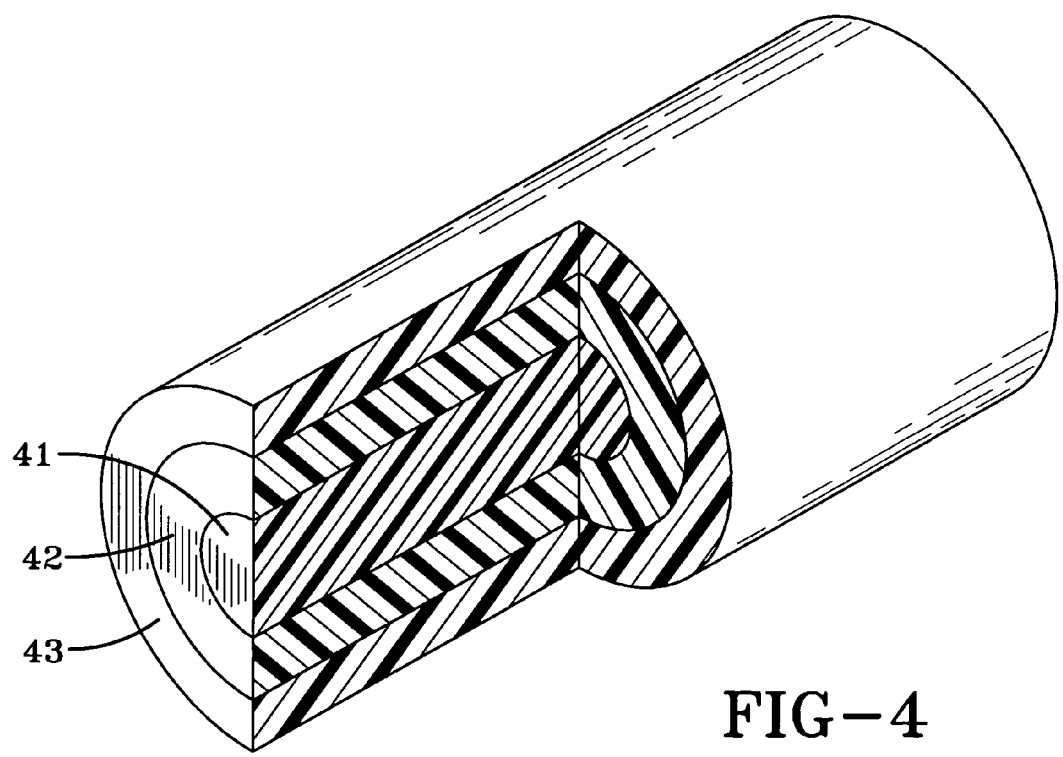
FIG. 4 depicts a resin pellet of three compartmentalized zones configured in two concentric layers surrounding a core.

The core-sheath structure is obtained using two extruders. If a third material in another zone is desired, an additional extruder is required. The first extruder supplies the liquid feed forming the core material which is linearly extruded at the center of the strand. At the same time, the sheath material is extruded in the second extruder into the sheath layer which concentrically covers the core. U.S. Pat. No. 6,669,986 discloses a multiple hole die apparatus to manufacture a core-sheath pellet. FIG. 1 depicts the core-sheath compartmentalized pellet having a core 1 which is substantially covered by a sheath 2. In the preferred embodiment, the polyester would be extruded into the outer sheath 2 and the polyamide (MXD6) extruded into the core 1. It is apparent to one skilled in the art that the strand could consist of more than two annular concentric layers, such as FIG. 4. This could be accomplished by using another extruder and different die.

The first step is to extrude a multilayer strand. One component is extruded in the center of the pellet and the other component is extruded around the center component. The extruded multilayer strand is cut by a pelletizer before or after it is cooled, as required, and formed into multilayer pellets.

The strand is then cooled by conventional methods. For example, the strand can be immersed in a water tank with cool water. The water-cooled multilayer strand is preferably sent to the pelletizer after removing surface moisture, often done by a spin dryer.

The pelletizer cuts the multilayer strand into a specified length by driving a rotary knife, or the like. By cutting the multilayer strand as it is, double columnar form multilayer pellets comprising the core material and the sheath material are obtained.

Figure 3:
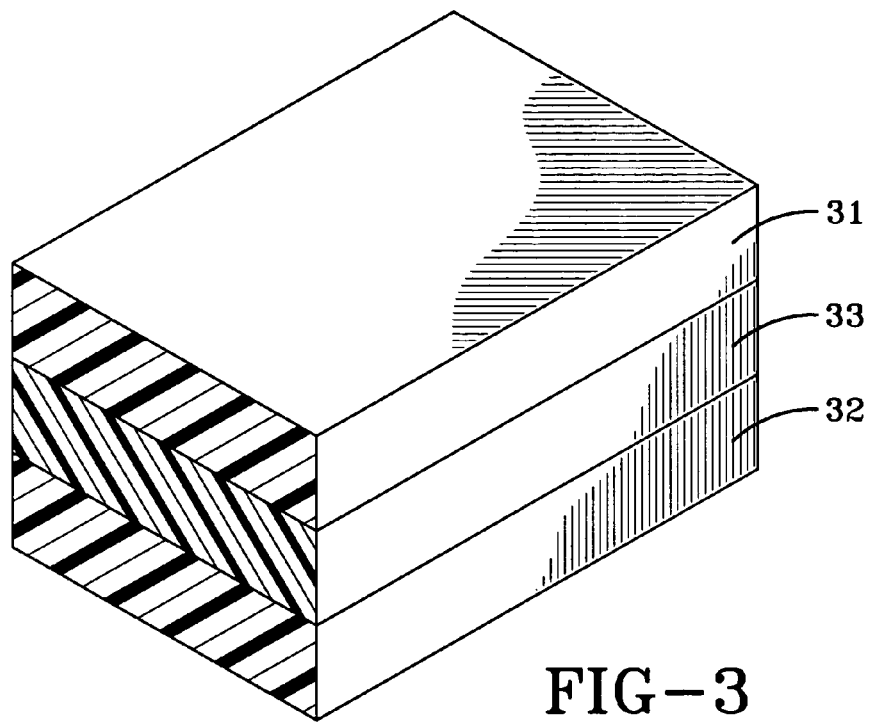
FIG. 3 depicts a resin pellet with three compartments or zones in a multi-layered or sandwich configuration.

In general, multilayer pellets with an outside diameter of about 2 to 8 mm are manufactured. The present invention is also not limited to pellets made from strands. For example, as revealed in U.S. Pat. No. 5,627,218, the thermoplastic polymers can be cast into layered sheets that are then cut in a cube form as well. The minimum structure is two layers, but the preferred structure for a cast structure of this invention is depicted in FIG. 3. In the sandwich or layered construction there are at least three layers wherein the middle layer 33 is sandwiched between a first outer layer 31 and a second outer layer 32.

The compartmentalized zones can be classified as a first compartmentalized zone, a second compartmentalized zone, and sequentially labeled with each increasing zone number. For instance, a core-sheath design has a minimum of two compartmentalized zones. The core sheath design could have more zones depending upon the number of concentric rings.

The size of the compartmentalized zone distinguishes it from a zone associated with a homogenous dispersion. The homogenous dispersion creates zones, but they are finely divided with each zone representing a very small percentage of the total volume of the pellet. The compartmentalized zone will be a much greater percentage of the total volume.

This is easily demonstrated using the core sheath shown in FIG. 1. The percentage of the volume of the compartmentalized zone (core) relative to the whole pellet is the ratio of the diameter of the core squared to the diameter of the cylindrical portion of the pellet squared. The ratio of the radii squared works just as well. This ratio can be estimated by looking at the extrusion die and using the ratio of the diameters of the holes casting the strand. The actual ratio can be measured by SEM (scanning electron microscopy), microscopic examination, or separation of the components and calculating the required volume associated the density adjusted weight of the recovered components.

To be a compartmentalized zone, the volume of the zone must be at least 0.001 percent of the total volume of the pellet. In practicality, 0.01 volume percent is more preferred, with at least 0.1 volume percent the most preferred.

One explanation for the superiority of the multi-component pellet is that through proper placement, the reactive component is not exposed to the released by-product. In most thermal processes, the by-products radiate outward from the center of the pellet and diffuse through the polymer to the outer wall where the by-products are removed from the pellet surface. It is therefore believed advantageous, but not essential to the invention, to place the component releasing the reactive by-product between the outer wall of the pellet and the component that reacts with the by-product. A polyester sheath and polyamide core is an example of this structure. The reverse structure of placing the reactive component between the wall and the component releasing the by-product would pass the by-product through the reactive component possibly degrading and discoloring the reactive component.

The difference in surface area is another possible explanation for the improved performance of the compartmentalized heterogeneous structure over the homogeneous dispersion. The homogeneous dispersion breaks up the reactive material into fine particles leaving a tremendous amount of surface area available to react with the by-product. Keeping the reactive material heterogeneous minimizes the surface area available to react and may allow the reactive component to surround the component releasing the by-product.

A preferred embodiment is the core-sheath design wherein the core comprises m-xylylene adipamide polyamide (MXD6) with a number average molecular weight between 4000 and 50,000 and the sheath comprises a polyester, specifically polyethylene terephthalate or polyethylene terephthalate copolymer with an Intrinsic Viscosity (I.V.) between 0.4 and 1.2 dl/g. Once the pellet is made, both materials can then be further processed under standard conditions of crystallizing, solid phase polymerization or drying in air without imparting a significant color shift to the finished article when compared to a control which has had the MXD6 homogeneously dispersed in the polyester and subjected to the same thermal treatment.

It is specifically contemplated that the pellet comprises at least one component with an I.V. between 0.2 and 1.2 dl/g. For example one could use a film forming polyester of at least 0.45 dl/g, an intermediate feed I.V. of 0.49 to 0.59 dl/g, more preferably 0.52 to 0.56 dl/g. The pellet could also use a polyester bottle resin of feed I.V. ranging from 0.59 to 0.69 dl/g, more preferably 0.61 to 0.64 dl/g, with a typical I.V. for bottles ranging from 0.72 to 0.84 dl/g, more preferably 0.74 to 0.82 dl/g. For packaging trays the typical I.V. ranges from 0.85 to 1.02 dl/g, more preferably from 0.89 to 0.95 dl/g. It is noted that while the measured I.V. of a polymer is a single value, that value represents the composite of the various molecule chain lengths. The typical I.V. increase during thermal processing is at least 0.1 dl/g, but can be as high 0.2 or even as high as 0.4 dl/g.

The invention is indifferent as to whether the materials are crystalline or amorphous. For example, a pellet with a sheath of a 0.49 I.V. PET encapsulating a core comprising MXD6 nylon with number average molecular weight 25,000 (MXD6—Grade 6007 from Mitsubishi Gas Chemical) prior to crystallization is one of the embodiments. That same pellet after crystallization is one of the embodiments, as is the same pellet which has been solid phase polymerized and the PET I.V. is now 0.84 and the number average molecular weight of the MXD6 nylon has also increased. The drying of a pellet which has been solid phase polymerized is also one of the envisioned embodiments of the thermal processes.

One skilled in the art will recognize that molecular weight is often increased during thermal treatment and that a component's location in the pellet will influence the rate of I.V. increase. Once the final molecular weight has been decided for each component, the person skilled in the art will select a lower starting molecular weight of each respective component such that the final molecular weight of each component after thermal processing is the desired molecular weight of each component required of the final article. This starting I.V. can be easily determined by traditional iterative optimization techniques.

One skilled in the art will also recognize that a pellet can be made which significantly different intrinsic viscosities and melt viscosities in different zones. For example, it is well known that polyfunctional co-monomers such pyromellitic dianhydride (PMDA), and pentaerythritol increase the solid phase polymerization rate of polyester and also decrease the temperature for solid state polymerization. This allows one to reduce the exposure to high temperatures for a long time. The zoned pellet with PET/PMDA in the sheath would allow processing of those materials which cannot tolerate the traditional solid phase polymerization conditions. In this embodiment the pellet is constructed with PET and the appropriate amount of PMDA in the outer sheath and the material that cannot tolerate the traditional time and temperature is in the core. Many of the acetaldehyde scavengers and barrier polymers such as poly ethyl vinyl alcohol (EVOH) are in this category. The pellet is exposed to solid phase polymerization conditions at a lower temperature or for a much shorter time, and in some cases a lower temperature for less time than the traditional conditions.

Figure 2:
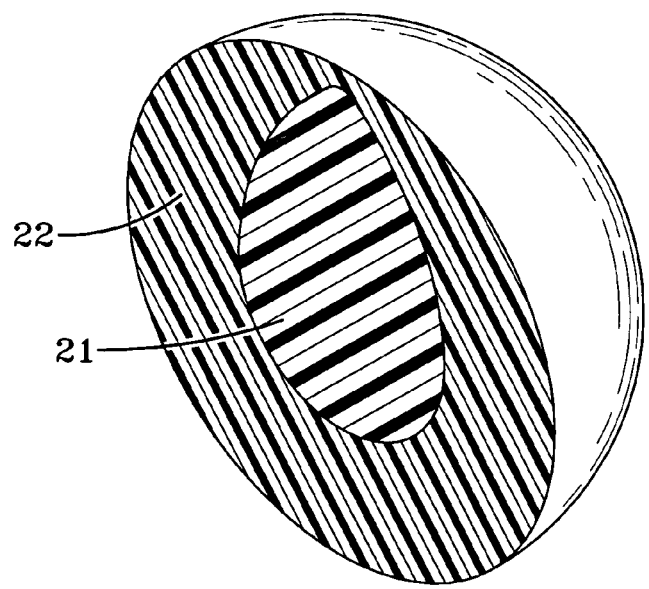
FIG. 2 depicts a resin pellet with two compartments or zones in the core-sheath configuration where the core is encapsulated, surrounded, or enclosed by an outer sheath layer.

Another preferred embodiment, as depicted in FIG. 2, is to close the ends of the pellet so the inner core 21 is completely surrounded and enclosed by a sheath 21. This structure surrounds the reactive material and seals off the ends so they do not react with the by-products of thermal processing that exist in the surrounding environment or oxygen that may exist in the atmosphere during storage. U.S. Pat. No. 6,669,986 teaches that spherical, elliptical or disk-form multi-layer pellets with the overall circumference including the end face of the core material coated with sheath material can be made by rounding the cut end face. One way to make a pellet with an outer layer sheath that encloses the contents of the inner layer(s) is to cut the pellet strand next to the die underwater. The preferred pellet structure is an MXD6 core surrounded by a polyester copolymer.

It needs to be recognized that absolute separation of the compartmentalized zones is not essential. Even though the materials may be in separate zones, there may be some polyamide (MXD6) in the polyester zone and some polyester in the polyamide (MXD6) zone.

In fact, the polyamide zone or the polyester zone may have a compatibilizer homogenously dispersed in that zone to aid in compatabilizing the polyamide with the polyester during the final melt mixing step.

Examples of such compatibilizers are found in U.S. Patent Application 2004/0013833 A1 which describes a low haze container which comprises at least a first layer comprising a compatibilized polymer blend, said compatibilized polymer blend comprising polyamide, PET or a PET-containing copolymer, and at least one compatibilizers selected from isophthalic acid (IPA)-modified PET and PET ionomers. The application describes other compatibilizers as well. This application describes the IPA-modified PET as preferably comprising from 1 to 6 mole percent IPA (isophthalic acid). The preferred PET ionomer is sulfonated PET. Other compatibilizers include p-toluene sulfonic acid modified PET, pyrometillic dianhydride modified PET, and maleic anhydride modified PET, acrylic modified polyolefin type ionomers and low molecular weight bisphenol-A epoxy resin-E44, trimellitic anhydride coupled using a bifunctional coupler.

The preferred compatibilizer is an ionic compatibilizer, preferably a copolyester containing a metal sulfonate salt group. The metal ion of the sulfonate salt may be Na+, Li+, K+, Zn++, Mn++, and Ca++. The sulfonate salt group is attached to an aromatic nucleus such as a benzene, naphthalene, diphenyl, oxydiphenyl, sulfonyldiphenyl, or methylenediphenyl nucleus.

Preferably, the aromatic acid nucleus is sulfoisophthalic acid, sulfoterephthalic acid, sulfophthalic acid, 4-sulfonaphthalene-2,7 dicarboxylic acid, and their esters. The preferred range of the ionic compatibilizer is 0.1 to 2.0 mole percent by weight of the respective acid or glycol moiety.

The compatibilizer may exist as a third component in the compartmentalized pellet and may be present in any compartment. Alternatively, the ionic compatibilizer can be polymerized into the molecular chain of the polyester resin.

It has also been discovered by the inventors of the present application that a PET modified with cyclohexanedimethanol (CHDM), available as PETG from Eastman Chemical Company (USA), is a compatibilizer as well (See Example 3). It should also be understood that the compatibilizers, in particular the polyester based compatibilizers, need not be placed in the polyamide compartment.

For clarification, it is specifically contemplated that the minor zone contain the material of the major zone. For example, Example Series 4 demonstrates the surprising result that for the pellet of a polyester sheath and polyamide core, the color of the final product can be maintained and the clarity improved when the core contains both the polyamide and the polyester ratios of at least as high as 1:1.

It has also been found that a pure polyamide core creates voids at high strand production speeds. High production speeds with lower amounts of voids were obtained when PET was placed into the core with the MXD6. Therefore, for at least the polyethylene terephthalate or polyethylene terephthalate copolymer sheath and MXD6 core construction, the core should contain polyethylene terephthalate and/or polyethylene terephthalate copolymer to improve compatibility and eliminate voids at higher production rates. The preferred amount of polyester in the core is the minimum amount required to maintain the polyester as the continuous phase and the polyamide as the dispersed phase. This preferred amount will vary by the I.V. of the polyester and polyamide. There is every reason to believe these phenomena would be applicable to other constructions as well, including the polyester/organic scavenger construction discussed below.

Another way to reduce voids is the traditional adjustments of the water temperature and cooling time of the strand after extrusion and prior to pelletizing. Void formation for the PET sheath and MXD6 core construction can be reduced by increasing the cooling time and raising the temperature of the cooling water to slow the cooling so that the differential cooling of the sheath and core is minimized.

Suitable thermoplastic polymers for use in the present invention include any thermoplastic homopolymer or copolymer. Examples of these include aliphatic, partially aromatic and aromatic polyamides, polyethylene terephthalate, polyethylene terephthalate copolymers, polybutylene terephthalate and its copolymers, polytrimethylene terephthalate and its copolymers, and polyethylene naphthalate and its copolymers, branched polyesters, polystyrenes, polycarbonate, polyvinyl chloride, polyvinylidene dichloride, polyacrylamide, polyacrylonitrile, polyvinyl acetate, polyacrylic acid, polyvinyl methyl ether, ethylene vinyl acetate copolymer, ethylene methyl acrylate copolymer, polyethylene, polypropylene, ethylene-propylene copolymers, poly(1-hexene), poly(4-methyl-1-pentene), poly(1-butene), poly(3-methyl-1-butene), poly(3-phenyl-1-propene) and poly(vinylcyclohexane). Some examples of oxygen inert thermoplastic polymers include polyethylene terephthalate, polyethylene terephthalate copolymers, polybutylene terephthalate and its copolymers, polytrimethylene terephthalate and its copolymers, and polyethylene naphthalate and its copolymers, branched polyesters, polystyrenes, polycarbonate, polyvinyl chloride, polyvinylidene dichloride, polyacrylamide, polyacrylonitrile, polyvinyl acetate, polyacrylic acid, polyvinyl methyl ether, ethylene vinyl acetate copolymer, ethylene methyl acrylate copolymer.

Preferably, the thermoplastic polymer used in the present invention comprises a polyester polymer or copolymer such as polyethylene terephthalate or a crystallizable copolymer of polyethylene terephthalate. A copolymer of polyethylene terephthalate or polyethylene terephthalate copolymer is also expressed as copolyethylene terephthalate. A copolymer of polyethylene terephthalate or polyethylene terephthalate copolymer is a polyester wherein at least 85% of the repeating acid units based upon the total number of acid units are derived from terephthalic acid or the diester of terephthalic acid, at least 85% of the repeating glycol units based upon the total number of glycol units are derived from ethylene glycol and the remainder of the acid and/or glycol units are derived from at least one other different repeating unit. A third, and subsequent repeating unit could be, for example, isophthalic acid, 2,6 naphthalene dicarboxylic acid, cyclohexanedimethanol, or 1,4 butane diol.

For clarification the unmodified term PET refers to polyethylene terephthalate or copolyethylene terephthalate. The modifier crystallizable refers to the ability of the polymer to be crystallized to some extent as measured by differential scanning calorimetry (D.S.C.). Typical crystallinity levels range from 5 to as high 65 percent depending upon the type of thermal treatment and nucleation techniques used. Typically a polymer will be considered amorphous when it has less than 5% crystallinity.

There are two types of crystalline structures; one is strain induced crystallinity which orders the molecules by exposing the material to force at an elevated temperature below the melt point. This type of crystallinity is also known as orientation and occurs when fibers are drawn or when bottles are stretch blown. Because of the order and orientation of the crystals, the materials with strain induced crystallinity are generally clear. Non-strain induced crystallinity occurs when the amorphous material is heated in the absence of a stress. The material will become white. This crystallinity is random in nature and is very brittle. The embodiments of this invention can be conducted on amorphous pellets (those with less than 5% crystallinity), strain induced crystalline pellets, non-strain induced crystalline pellets and pellets with both strain induced and non-strain induced crystallinity. Pellets with both types of crystallinity would come from orienting the strand during the extrusion process and then exposing the cut pellets or strand to heat sufficient to convert some of the remaining amorphous material in the pellet to a non-strain induced crystalline morphology.

It will be understood that the thermoplastic polymer suitable for use in the present invention can be made into a film, sheet, or injection molded article.

Polymers employed in the present invention can be prepared by conventional polymerization procedures well known in the art. The polyester polymers and copolymers may be prepared by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. For clarity, a polymer of terephthalate, isophthalate and naphthalate with ethylene glycol, diethylene glycol and cyclohexanedimethanol contains six distinct monomers and is considered a copolymer. The diversity of the repeat units depends on the number of different types of monomers present in the initial polymerization reaction. In the case of polyesters, copolymers include reacting one or more diols with one or more diacids, and are sometimes also referred to as terpolymers. Additionally, randomization of the monomers is not necessary. A copolymer or terpolymer also refers to a polymer with different monomers be they in block or random distribution.

Suitable dicarboxylic acids include those comprising from about 6 to about 40 carbon atoms. Specific dicarboxylic acids include, but are not limited to, terephthalic acid, isophthalic acid, naphthalene 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalic diesters.

Also included are the monomers which create polyester ionomers such as metallo-sulfonates. Included in these are the sulfonated isophthalate salts of lithium, sulfur, and phosphorous.

These acids or esters may be reacted with an aliphatic diol having from about 2 to about 10 carbon atoms, a cycloaliphatic diol having from about 7 to about 14 carbon atoms, an aromatic diol having from about 6 to about 15 carbon atoms, or a glycol ether having from 4 to 10 carbon atoms. Suitable diols include, but are not limited to, 1,4-butenediol, trimethylene glycol, 1,6-hexanediol, 1,4-cyclohexanedimethanol, diethylene glycol, resorcinol, and hydroquinone.

Polyfunctional comonomers can also be used, typically in amounts of from about 0.1 to about 3 mole percent. Suitable comonomers include, but are not limited to, trimellitic anhydride, trimethylopropane, pyromellitic dianhydride (PMDA), and pentaerythritol. Polyester-forming polyacids or polyols can also be used.

One preferred polyester is polyethylene terephthalate (PET homopolymer) formed from the approximate 1:1 stoichiometric reaction of terephthalic acid, or its ester, with ethylene glycol. Another preferred polyester is polyethylene naphthalate (PEN homopolymer) formed from the approximate 1:1 to 1:1.6 stoichiometric reaction of naphthalene dicarboxylic acid, or its ester, with ethylene glycol. Yet another preferred polyester is polybutylene terephthalate (PBT). PET copolymers, PEN copolymers, and PBT copolymers are also preferred. Specific co- and ter-polymers of interest are PET with combinations of isophthalic acid or its diester, 2,6 naphthalic acid or its diester, and/or cyclohexane dimethanol.

The esterification or polycondensation reaction of the carboxylic acid or ester with glycol typically takes place in the presence of a catalyst. Suitable catalysts include, but are not limited to, antimony oxide, antimony triacetate, antimony ethylene glycolate, organo-magnesium, tin oxide, titanium alkoxides, dibutyl tin dilaurate, and germanium oxide. These catalysts may be used in combination with zinc, manganese, or magnesium acetates or benzoates. Catalysts comprising antimony are preferred. Because of this pellet's desirability in food packaging, other suitable polyesters and additives are listed in USA 21 CFR 177.1000-177.2910 (revised April, 1997 edition).

Another preferred polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. Aromatic and aliphatic acids which may be used simultaneously to make a copolymer include, for example, isophthalic acid and sebacic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis(acetylacetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

The preferred polymer of this invention may also contain small amounts of phosphorous compounds, such as phosphates, and a catalyst such as a cobalt compound, that tends to impart a blue hue. Other agents which may be included are infrared absorbers such as carbon black, graphite, and various iron compounds.

The melt phase polymerization described above may be followed by a crystallization step and then a solid phase polymerization (SSP) step to increase the molecular weight, as measured by Intrinsic Viscosity, necessary for bottle manufacture. The crystallization and polymerization can be performed in a tumbler dryer reaction in a batch-type system. Alternatively, the crystallization and polymerization can be accomplished in a continuous solid phase process whereby the polymer flows from one vessel to another after its predetermined thermal treatment in each vessel.

The crystallization conditions for PET preferably include a temperature of from about 100° C. to about 150° C. Typical thermal processing operations for crystallizing PET increase the crystallinity of the PET in the pellet by at least 5 percent. In the embodiments of this invention, the crystallinity of either component, such as PET, or polyamide, can be increased by 5 percent, or the increase in crystallinity of the two components combined can be 5 percent. It should be noted that the increase in the percent crystallinity is neither a weighted average of the components nor a percentage or value relative to the previous amount of crystallinity. An increase in the percent crystallinity, or increase in crystallinity is the absolute increase in crystallinity. When the crystallinity of PET and polyamide are combined, the increase in crystallinity is the absolute increase in crystallinity of the PET plus the absolute increase in crystallinity of the polyamide. For example, the phrase "an increase in crystallinity of at least 5 percent" means that at least 5 percent of the component has gone from amorphous to crystalline. It does not mean that a pellet with 20% crystallinity that undergoes a 5% increase in crystallinity has 21% crystallinity. It means that the pellet has 25% crystallinity. In many cases the increase in crystallinity will be an increase of at least ten percent and in some cases even as high as 15 to 20 percent.

The solid phase polymerization conditions preferably include a temperature of from about 200° C. to about 235° C., and more preferably from about 215° C. to about 235° C. The solid phase polymerization may be carried out for a time sufficient to raise the molecular weight to the desired level, which will depend upon the application and initial intrinsic viscosity. For a typical bottle application, the preferred molecular weight corresponds to an intrinsic viscosity from about 0.68 to about 0.88 deciliter/gram, as determined by the methods described in the methods section. The time required to reach this molecular weight may range from about 8 to about 45 hours. Typical increases in I.V. are at least 0.1 dl/g, with increases of 0.2 to 0.4 dl/g being more typical.

In one embodiment of the invention, the thermoplastic polymer matrix of the present invention may comprise recycled polyester or materials derived from recycled polyester, such as polyester monomers, catalysts, and oligomers. It has been discovered and shown in example 4B and 4C that PET with at least 75% homogeneously dispersed MXD6 can be successfully solid phase polymerized when placed into the core of the core sheath design when the total MXD6 content in the resin pellet is as high as 5%. This important discovery means that recycled polyester from used containers comprised of PET containing dispersed polyamides, such as MXD6 can be crystallized, solid phase polymerized and dried without the increased color currently associated with using recycled polyester containing dispersed polyamides such as MXD6 nylon. The recycle process need only place the recycled PET containing MXD6 nylon into the core and recycled PET or virgin PET that does not contain MXD6 in the sheath. In a typical recycle process, the PET in the core would contain at the most 10%, and more likely much less than 5% by weight, MXD6.

The other component of this embodiment is a compound that either produces a by-product during thermal processing which reacts with the other component or reacts with a by-product produced from the other component during thermal processing. It is noted that both components may react with a by-product of the other.

If the polyester is the preferred material for the first component, then a polyamide is the preferred material of the second component. Polyamides suitable for this invention can be described as comprising the repeating unit amino caproic acid or A-D, wherein A is the residue of a dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4 cyclohexanedimethylamine, or a mixture thereof. These polyamides can range in number average molecular weight from 2000 to 60,000 as measured by end-group titration. These polyamides can also be described as the reaction product of amino caproic acid with itself and/or the reaction product of a residue of dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof with a residue of a diamine comprising m-xylylene diamine, p-xylylene diamine, hexamethylene diamine, ethylene diamine, or 1,4 cyclohexanedimethylamine, or a mixture thereof.

Those skilled in the art will recognize many of the combinations as well known commercially available polyamides. The reaction product of the residues of sebacic acid with hexamethylene diamine is nylon 610 and the reaction product of the residues of adipic acid and hexamethylene diamine is nylon 66. Nylon 612 is another nylon which benefits from the invention. Nylon 6 is a special type of polyamide which is made by the opening of caprolactam and then polymerizing the resulting amino caprioc acid which has a formula of $H_2N$—$(CH_2)_5$—COOH. The preferred polyamide is the reaction product of the residues of adipic acid and m-xylylene diamine, known as poly-m-xylylene adipamide. This product is commercially known as MXD6 or nylon MXD6 and can be purchased from Mitsubishi Gas Chemical Company, Japan.

Additionally, the polyamide may be modified with the monomers which create polyamide ionomers such as metallo-sulfonates. Included in these are the sulfonated isophthalate salts of lithium, sulfur, and phosphorous. These could be introduced for example as the dicarboxylic acid, pre-reacted diester, or diamine. U.S. Pat. No. 3,328,484, whose teachings are incorporated herein by reference, describes such modified co-polyamides.

The superiority of this invention over pre-compounding is demonstrated in Examples 2A, 1B and 2B. In Example 2A, the pellet of a polyester sheath and polyamide (MXD6) core was made and kept at 140° C. and <1.33 millibar for 5 hours to crystallize the material. After crystallization, the pellet was exposed to <1.33 millibar (<1 mm Hg) vacuum at 230° C. for approximately 13 hours to increase the molecular weight. The pellets were then dried in air at 160° C. for 6 hours and injection molded into preforms.

The homogenously dispersed compounded control of PET/MXD6 (Example 2B) was kept at <1.33 millibar (<1 mm Hg) and 140° C. for 5 hours to crystallize the material and then dried in air at 160° C. for 6 hours and injection molded into preforms.

A physical blend control (Example 1B) was made by drying separate pellets of PET and MXD6 in the presence of dry air at 160° C. for 6 hours and injection molded into preforms.

The color of the preform made from the homogeneously dispersed control was $b^*$=+23.1, the color of the physical blend control was $b^*$=−5.8. By comparison, the embodiment of the invention was a $b^*$=−4.7.

Not only do these experiments demonstrate the utility of the compartmentalized pellet structure, they also disclose a process for simultaneously thermally treating two materials. That thermal treatment includes but is not limited to crystallization, drying, solid phase polymerization or any of those in combination. While these experiments are conducted in rotating vacuum blenders, they can easily be conducted in commercial scale vibrating fluid bed crystallizers in the presence of air or inert gas such as nitrogen and continuous solid phase polymerizers in the presence of inert gas such as nitrogen.

A second benefit of this invention is a pellet that contains at least one oxygen inert polymer, such as polyester, at least one oxygen sensitive component, and at least one reaction promoter which when placed in contact with the oxygen sensitive component either initiates or catalyzes the reaction of the oxygen sensitive component with oxygen and thus makes the oxygen sensitive component an oxygen reactive component.

For the purposes of this specification, the component that reacts with oxygen is known as an oxygen reactive component or oxygen scavenger. The reaction of the component with oxygen is often promoted by an additional component that is also present in the wall of the package. A component that becomes reactive to oxygen when in the presence of a promoter is called an oxygen sensitive component. The promoter usually initiates and often catalyzes the reaction of the oxygen sensitive component with oxygen. After the oxygen sensitive component is exposed to the promoter and becomes reactive with oxygen, the oxygen sensitive component becomes an oxygen reactive component. The oxygen sensitive/reactive component may be organic, inorganic or a metal in a reduced valence state.

In contrast, the phrase oxygen inert component refers to a component which does not become reactive with oxygen when placed in contact with the promoter at levels that make the oxygen sensitive component an oxygen reactive component. This can easily be determined by combining the oxygen sensitive component with the promoter and measuring the oxygen consumption. The proposed oxygen inert component is then combined only with the promoter and the oxygen reactivity measured. It has been observed that most organic compounds exhibit some very small inherent amount of reactivity to oxygen. Therefore to be an oxygen inert component in the context of this specification, the component with the promoter should show less than a 20% and preferably less than 10% increase, and preferably no increase, in oxygen consumption than the component without the promoter. The slightly higher increase may be caused by trace amounts of catalyst, contaminants, or even the promoter which in and of itself may react with oxygen to a small degree.

In this embodiment, the polymer, the oxygen sensitive component and promoter are heterogeneously placed in zones or compartments of the pellet so that there is an insufficient amount of promoter in direct contact with the oxygen sensitive component to substantially initiate or catalyze the reaction with oxygen, but there is more than enough promoter to do this when the ingredients are homogenized when mixed during the final melt extrusion step.

The critical factor is that the promoter and oxygen sensitive component be substantially heterogeneously placed into pellets as opposed to being homogenously dispersed or solubilized in each other. In one embodiment, the oxygen sensitive component is placed in either the core or sheath compartment and the promoter disbursed into the oxygen inert component in amounts sufficient to initiate and/or catalyze the reaction of the oxygen sensitive component with oxygen when the pellet is processed in the final melt mixing step. With this configuration the oxygen sensitive component remains essentially unreactive with oxygen until it is combined with the promoter during the final melt mixing. The pellet of the invention can now be stored in an oxygen containing environment such as air and be subjected to thermal treatments in the presence of oxygen because the oxygen sensitive compound exhibits little or no reactivity with oxygen until final melt mixing.

The oxygen reactive compound can be one of many compounds. The oxygen reactive compound of this particular embodiment is an oxygen sensitive component that requires a reaction promoter to initiate or catalyze the reaction with oxygen. Active Food Packaging, M. L. Rooney ed., 1995, p 74-110, the teachings of which are incorporated herein by reference, describes various types of oxidizable organic oxygen sensitive compounds. The oxygen sensitive compounds are generally ethylenically unsaturated organic compounds and have at least one allylic hydrogen which is cleaved in the presence of oxygen and a promoter which is an initiator or catalyst. In this context a catalyst can be an initiator but an initiator is not always a catalyst. Generally, the reaction with oxygen is very slow or non-existent without the presence of the initiator or catalyst. An initiator is anything which starts the fast reaction of the compound with oxygen. A catalyst can both start the reaction and increase the rate of the reaction but does not participate in the reaction.

It should also be noted that polyamides, like polyolefins, become reactive with oxygen in the presence of a transition metal catalyst and are therefore also oxygen sensitive components. Thus, polyamides are also one of the preferred oxygen sensitive components for the second object of the invention. Specifically, the polyamides described in the previous embodiment are suitable oxygen sensitive components. Of those polyamides, the m-xylylene adipamide moiety is preferred. Polybutadiene, polybutadiene oligomers and terpenes are other examples of oxygen sensitive materials that are promoted (initiated and/or catalyzed) by a transition metal catalyst.

Other examples of oxidizable organic compounds are listed in U.S. Pat. No. 6,406,766, the teachings of which are incorporated herein by reference. Specific examples include polybutadiene, unhydrogenated polybutadiene oligomers, polypropylene oxide oligomers, and methyl pendant aromatic compounds. Many forms of polybutadiene will work including those with high-cis, high-vinyl and syndiotatic microstructures.

In addition to being physically blended with the major component, the oxygen sensitive moiety can be chemically functionalized in one or more areas and reacted with a material compatible with the major component. Such functionalization can place at least one carboxyl, hydroxyl, or amine group in the moiety. Preferably there are two functional groups occurring at each end of the moiety. The types of materials compatible with the polyester are the reaction product of predominately polycondensate segments selected from the group consisting of polyesters as recited in USA 21 CFR 177.1590 and polyamides with a minor amount of oxygen sensitive moiety segments selected from the group consisting of functionalized polybutadiene, unhydrogenated polybutadiene oligomers, polypropylene oxide oligomers and methyl pendant aromatic compounds. USA 21 CFR 177.1590 describes the polycondensates as polyester elastormers produced by the ester exchange reaction when one or more of the following phthalates—dimethyl terephthalate, dimethyl orthophthalate, and dimethyl isophthalate—is made to react with alpha-hydroomega-hydroxypoly(oxytetramethylene) and/or 1,4 butanediol such that the finished elastomer has a number average molecular weight between 20,000 and 30,000. These condensates can also be described as a polycondensate comprised of one or more phthalates selected from the group consisting of terephthalate, orthophthalate, and isophthalate, wherein said polycondensate is further comprised of one or more glycols selected from the group consisting of alpha-hydroomega-hydroxypoly (oxytetramethylene) and 1,4 butanediol, and the polycondensate has a number average molecular weight between 20,000 and 30,000. The alpha-hydroomega-hydroxypoly (oxytetramethylene) is the polymeric form of the 1,4 butanediol. Monoethylene glycol (ethylene glycol) and its polymer also known as polyethylene glycol are also suitable.

Usually, the best compatibility is obtained when the oxygen scavenging material is reacted with the major component itself. U.S. Pat. No. 6,406,766 describes how this can be accomplished. Because U.S. Pat. No. 6,406,766 teaches reacting the functionalized polybutadiene into the polyester segment, its inventors view the functionalized polybutadiene as a monomer to the polyester segment. For purposes of this disclosure, the term functionalized polybutadiene is an equivalent to the term polybutadiene monomer found in U.S. Pat. No. 6,406,766. Preferably the functionalized oxygen scavenger is reacted with the same type of material as the major component. In other words, the best compatibility with polyethylene terephthalate is obtained when the functionalized oxygen scavenger is reacted with polyethylene terephthalate or a polyethylene terephthalate copolymer.

The promoter is an initiator or catalyst and is any compound that starts or accelerates the reaction of the oxygen sensitive component with oxygen. The promoter is usually a transition metal, most preferably a cobalt salt, such as cobalt neodecanoate and is not consumed by the reaction of the oxygen sensitive material with oxygen. Additionally, the oxygen sensitive component is sufficiently unreactive to oxygen unless the promoter is present in sufficient quantities. The promoter may also require an event external to the pellet such as radiant energy (light, UV light, microwave) or contact with another substance such as water to initiate the reaction with oxygen or release the initiator.

The amount of promoter is usually experimentally determined based upon the amount of oxygen consumption required, the type of oxygen sensitive component, and the type of promoter. In a general sense, the amount of promoter varies between 30 and 1000 ppm of the metal ion to the oxygen sensitive component. More preferably, the value is between 50 and 500 ppm, with the most desired range being 100 to 300 ppm metal ion by weight of the oxygen sensitive component.

The amount of oxygen sensitive component to oxygen inert component depends upon the effectiveness of the oxygen sensitive component to react with oxygen once it becomes oxygen reactive. Effective oxygen consumption occurs when the oxygen sensitive component and/or oxygen reactive component exists between 1 and 12 weight percent. More preferably, the oxygen sensitive/oxygen reactive component should be present at a level from 2 to 8 weight percent of the resin pellet. Most industrial applications will find utility at a level from 4 to 6 weight percent.

The preferred embodiment is to place the un-promoted oxygen sensitive component, preferably a polyamide such as MXD6, unhydrogenated polybutadiene oligomers or unhydrogenated polybutadiene oligomers reacted into a polyester backbone into the core of the pellet and place the cobalt promoter and polyester into the sheath or outer configuration layer. Under this configuration, the cobalt promoter stays in the polyester (oxygen inert) phase until the final melt-mixing step at which time the oxygen sensitive component is dispersed throughout the polyester and comes into intimate contact with the cobalt salt thereby initiating and catalyzing the reaction of oxygen with the oxygen sensitive component. At this point, the oxygen sensitive component becomes an oxygen reactive component.

One skilled in the art will recognize that the amount of promoter may be minimized by determining the maximum level of promoter which can be added to the oxygen sensitive component yet not significantly promote the reaction with oxygen and determining the total amount of promoter needed to promote the reaction under complete dispersion and placing at least the remaining amount of promoter in the polyester sheath.

A third embodiment is to place the already initiated/catalyzed or otherwise oxygen reactive component in the core, and place a high barrier component between the oxygen reactive component and the outer edge of the pellet, such as in the sheath. The preferred embodiment would be a sheath that surrounds the oxygen reactive material and reduces the amount of oxygen reaching the oxygen reactive component thereby preserving oxygen reactive capacity during storage. Again, MXD6 with a cobalt salt, polybutadiene with a cobalt salt and unhydrogenated polybutadiene reacted into the polyester combined with a cobalt salt are the preferred materials for the core. These components are surrounded by a sheath of polyethylene terephthalate or its crystallizable copolymers. The polyester is subsequently crystallized virtually eliminating oxygen permeation to the oxygen reactive component in the core.

It is also worth noting that the functionalized (unhydrogenated) oxygen reactive component may be present in two forms. First, it may be present as a functionalized material that has not yet been reacted into the polymer backbone. The reaction into the backbone of a component in another compartment would occur during final melt-mixing. A similar reaction is described in U.S. Pat. No. 5,747,548. However, U.S. Pat. No. 5,747,548 is limited to those structures wherein the components are both dissimilar and become chemically interreactive with each other during final melt mixing. U.S. Pat. No. 5,747,548 contemplates nothing about systems which react with external compounds such as oxygen or those systems which react only in the extruder.

For clarity, the current invention applies to pellets that may also have interactive/interreactive components in addition to reaction to by-products and/or oxygen. The oxygen sensitive or oxygen reactive component may or may not be one of those interactive/interreactive components. The critical factor of the present embodiment is the presence of a promoter of the reaction with compounds external to the pellet, such as oxygen, and that the promoter is kept separate from the oxygen sensitive compound or that the oxygen reactive component be shielded from oxygen so that either embodiment reduces the rate of oxygen reactivity of the pellet at room temperature (23° C.+/−5° C.) by 20% over a control pellet.

The lack of oxygen reactivity of the invented zoned pellet structure is demonstrated in example series 5. The oxygen reactivity of the zoned structure (5C) containing PET, the oxygen sensitive component (MXD6) and the oxygen reaction promoter (cobalt neo-decanoate) is similar to the control (5A) containing just PET and the oxygen sensitive component. The amount of oxygen reacted after the first day is virtually the same with compartmentalized structure showing no increase in consumption over the seven day period. It is believed that the low result in the seventh day of the control is due to the fact that that sample was not placed into the vial until some time after the manufacture. During this time the small amount of inherent oxygen reactivity had already occurred.

By comparison, the comparative example (5B) reacted with or consumed almost twice the amount of oxygen in the seven day period. The retention of the oxygen scavenging capability is demonstrated in example 5D which is the zoned structure of 5C repelletized to mix all the ingredients. In this manner, the components are separated until they are ready to be combined at the last possible moment and the oxygen sensitive material is converted to an oxygen reactive material.

Another embodiment of the invention is the placement of the acetaldehyde scavenger or acetaldehyde reaction catalyst in one of the zones. Polyamides are one class of compounds that react with acetaldehyde and are discussed previously. Zirconium oxide particles are known to reduce acetaldehyde as well. Because the zirconium oxide is a particle, high levels of the compound would be cause haze in the finished product. The advantage of concentrating the zirconium dioxide in a zone is that it remains relatively unutilized until after solid phase polymerization when the acetaldehyde has been dramatically reduced from the levels common in the melt polymerization step. By incorporating the zirconium oxide into the core of the core sheath design prior to solid phase polymerization, less zirconium oxide would be needed because the large amounts of acetaldehyde are removed during the solid phase polymerization.

Test Methods

The amount of oxygen reacted by the pellets of the invention is determined and compared to a control pellet of similar size with the same amount of ingredients. In the case of the control, the ingredients are homogenously dispersed throughout the pellet. Or alternatively, the promoter is dispersed in the oxygen sensitive component which is then subsequently dispersed in the oxygen inert material.

The oxygen reactivity can be determined by placing pellets of the control into a sealed vessel and the same number of similar sized and weight compartmentalized pellets into a sealed vessel of the same size. The vessels are kept at the same temperature and the oxygen depletion in each vessel is measured at a certain point in time, preferably seven days. For example, one can place the same amount of same sized pellets into two gas chromatograph vials and sealed. Vial A will contain the homogeneous dispersion. Vial B will contain the embodiment. The vials are maintained in the same environment (temperature, preferably 23+/−5° C.) for seven days. The actual temperature level is not as essential as keeping both vials exposed to the same temperature profile over the seven days. After seven days, each vial is analyzed for its oxygen content. The reduction in oxygen content from atmospheric amounts of oxygen is the amount of oxygen scavenged or reacted. Variations in pellet weight are accounted for by dividing the amount of oxygen consumed by the amount of material in the vial and expressing the value in cubic centimeters of oxygen scavenged (reacted) per gram of polymer. If the pellets are the same size and equivalent number of pellets used, this normalizing adjustment is not necessary. The same test can be done by placing the pellets in a foil bag and analyzing the gas in the foil bag for the reduction in oxygen. The successful construction will consume at least 20 percent less oxygen than the control in the seven day period.

Intrinsic Viscosity

The intrinsic viscosity of intermediate molecular weight and low crystalline poly(ethylene terephthalate) and related polymers which are soluble in 60/40 phenol/tetrachloroethane was determined by dissolving 0.1 grams of polymer or ground pellet into 25 ml of 60/40 phenol/tetrachloroethane solution and determining the viscosity of the solution at $30 \leq$ C.+/−0.05 relative to the solvent at the same temperature using a Ubbelohde 1B viscometer. The intrinsic viscosity is calculated using the Billmeyer equation based upon the relative viscosity.

The intrinsic viscosity of high molecular weight or highly crystalline poly(ethylene terephthalate) and related polymers which are not soluble in phenol/tetrachloroethane was determined by dissolving 0.1 grams of polymer or ground pellet into 25 ml of 50/50 trifluoroacetic acid/dichloromethane and determining the viscosity of the solution at 30° C.+/−0.05 relative to the solvent at the same temperature using a Type OC Ubbelohde viscometer. The intrinsic viscosity is calculated using the Billmeyer equation and converted using a linear regression to obtain results which are consistent with those obtained using 60/40 phenol/tetrachloroethane solvent. The linear regression is $$I.V(\text{in 60/40 phenol/tetrachloroethane}) = 0.8229 \times I.V(\text{in 50/50 trifluoroacetic acid/dichloromethane}) + 0.0124.$$

Crystallinity Determinations.

Determination of crystallinity can be done by any of the common techniques. However, for pellets containing multiple compounds in either method, the measured density or the required amounts of heat (DSC technique) are adjusted by the weighted average of the amount of the compound in the pellet.

Component Separation and Determination of the Amount of Component in the Pellet.

The amount of each component in the pellet can be determined by many different techniques. For example, one can know how much of the compound was added when manufacturing the pellet, one can physically separate the components, or one can separate the components by dissolving the components away from each other, removing the solvent and taking the weight. In the case of polyamide-PET, formic acid can be used to dissolve the polyamide out of the core, leaving the PET sheath. The amount of PET can be directly weighed and the polyamide amount determined by difference. If the polyamide core contains other compounds which are not soluble in formic acid, the solution can be filtered and the polyamide precipitated from the formic acid by adding water. The sample is then dried and the amount of polyamide determined by direct weighing. In any case, small amounts of additives or other non-polyamide, non-PET materials would not affect the absolute value of the crystallinity to any great extent.

Once separated from the pellet, the individual crystallinity or intrinsic viscosity of the component can be determined. This invention is illustrated by the following examples that are merely for the purpose of illustration and are not to be regarded as limiting the scope of the invention or the manner in which it can be practiced. Unless specifically indicated otherwise, parts and percentages are given by weight.

EXPERIMENTAL RESULTS

In all the experimental work, the polyester and polyamides were predried and the pellet size was 2 grams/100 pellets. The preferred pellet size is smaller than 1.5 grams/100 pellets and more preferably smaller than 1.8 grams/100 pellets.

Example Series 1

Crystallizing and Drying in Air

1A—Compartmentalized Pellet

A compartmentalized pellet was made from 95 weight percent 0.84 I.V. polyethylene terephthalate copolymer (CLEARTUF® MAX from M&G Polymers USA) in the sheath and 5 weight percent MXD6 nylon (Grade 6007, 1.181 I.V., available from Mitsubishi Gas Chemical, Japan) in the core. The pellet was thermally treated at 140° C. and <1.33 millibar in a rotating vessel for 5 hours to crystallize (non-strain induced crystallinity) the material, dried in air for 6 hours at 160° C., and injection molded into 52 gram preforms. The Hunter color on the preform was L*=52.1, a*=−0.95 and b*=−4.91.

Comparative Examples 1B, 1C, 1D

1B—Polyester and Polyamide Dried in Same Vessel

A polyethylene terephthalate copolymer was prepared by taking 0.52 I.V. amorphous feed resin of the polyester of Example 1A and thermally treating it at 140° C. and <1.33 millibar in a rotating vessel for 5 hours to crystallize the material. After crystallization, the pellets were exposed to <1.33 millibar at 230° C. for approximately 13 hours in the same rotating vessel to build I.V. to 0.84 dl/gm. 95 percent by weight of the polyethylene terephthalate copolymer pellets and 5 percent by weight polyamide of example 1A were simultaneously placed in the same atmospheric air drier for 6 hours at 160° C. and then injection molded in preforms. Color of the preform was L*=53.3, a*=−0.36 and b*=−5.82

1C—Drying in Separate Vessels

Pellets of polyethylene terephthalate copolymer of Example 1A and pellets of polyamide of Example 1A were dried in separate vessels. The polyester was dried in atmospheric air at 154.4° C. overnight. The polyamide was dried overnight in a vacuum oven at 107.2° C. The dried pellets were final melt mixed in the proportion of 94.5 weight percent polyester and 5.5 weight percent MXD6 in the same injection machine under the same conditions as example 1A and molded into preforms. Average color of three preforms was L*=50.12, a*=0.10, and b*=−7.47.

1D—Crystallized and Dried Homogeneous Dispersion

The dried pellets the polyethylene terephthalate copolymer (PET) of Example 1A and the MXD6 nylon of Example 1A were homogeneously melt mixed (compounded) in the proportion of 94.5 weight percent and 5.5 weight percent, extruded and cut into pellets. The pellets of the melt mixed PET and MXD6 were crystallized by holding the pellets at <1.33 millibar in a rotating vessel for 6 hours and 140° C., dried in air for 6 hours at 160° C. and then injection molded into the same preform mold as Example 1A. Two Hunter color readings were taken on the same preform. The readings were L*=47.75/46.7, a*=−2.19/−2.17 and b*=11.35/12.9.

TABLE I

Preform Color After Crystallizing, Then Drying The Resin in Air

| Thermal Processes: Crystallized, then dried in air | L* | a* | b* |
|---|---|---|---|
| Compartmentalized Pellet | 52.1 | −0.95 | −4.91 |
| Polyester and Polyamide Dried In Same Vessel | 53.3 | −0.36 | −5.82 |
| Drying in Separate Vessels | 50.12 | 0.10 | −7.47 |
| Crystallized and Dried Homogeneous Dispersion | 47.75 | −2.19 | +11.35 |

Example Series 2

Crystallization, Solid Phase Polymerization and Air Drying

2A—Compartmentalized Pellet

A compartmentalized core-sheath pellet was made from 95.1% by weight polyethylene terephthalate copolymer of example 1B in the sheath and 4.9% by weight polyamide of example 1A in the core. The multi-component pellets were exposed to <1.33 millibar at 140° C. in a rotating vessel for 5 hours to crystallize the material. After crystallization, the pellets were exposed to <1.33 millibar and 230° C. for approximately 13 hours to build molecular weight. The intrinsic viscosity of the pellets before solid phase polymerization was 0.58 and 0.85 dl/g after solid phase polymerization. The pellets were then dried in air at 160° C. for 6 hours and extruded into the same preforms as Example 1A. Hunter color on the preform was L*=48.2, a*=−1.87, and b*=−4.71.

Comparative Example

2B—Melt Blended, Homogeneously Dispersed, Crystallized, Solid Phase Polymerized and Air Dried Pellets of homogeneously dispersed polyamide in PET were made by melt mixing 95 percent by weight of polyethylene terephthalate copolymer of Example 1B with 5 percent by weight polyamide of example 1A. The pellets of the homogenously blended PET and polyamide were thermally treated at 140° C. at <1.33 millibar for 5 hours in a rotating vessel to crystallize the material. After crystallization, the pellets were exposed to <1.33 millibar at 230° C. in the same vessel for approximately 13 hours to raise the intrinsic viscosity to 0.84 dl/g. The pellets were then dried in air for 6 hours at 160° C. and injection molded in the same preform mold as Example 1A. The Hunter color on the preforms was L*=42.93, a*=−0.61, and b*=+23.14.

TABLE II

Preform Color After Crystallizing, Solid Phase Polymerizing, Then Drying The Pellets in Air

| Configuration: Crystallized, Solid Phase Polymerized, Then dried in air | L* | a* | b* |
|---|---|---|---|
| Compartmentalized Pellet | 48.2 | −1.87 | −4.71 |
| Homogeneous Dispersion | 42.93 | −0.61 | +23.14 |

Series 3 Compatibilizers

These experiments were conducted by putting a polyester modified (PETG Grade 6763 from Eastman Chemical Company, USA) with cyclohexane dimethanol (CHDM) into the core with the polyamide with and without pyromelllitc dianhydride (PMDA), solid state polymerizing the pellet and the drying the pellets in air before injection molding the pellets into 27 gram preforms and blowing 500 ml bottles. Results indicate that the use of the CHDM modified polyester produced has less haze than isophthalic acid modified PET and the use of PMDA as indicated below reduces the haze even more.

Series 3A 1 & 2—Isophthalic Modified PET with and without Pyrometillic Anhydride (PMDA).

1. In these two sets of experiments, a compartmentalized pellet was made using the polyester of Example 1B as the sheath. The core was 15 percent by weight of the pellet and contained 33.33 weight percent of the polyamide of example 1A and 66.67 weight of a 0.62 I.V. polyester modified with 10 mole percent isophthalic acid. The pellet was then solid phase polymerized under vacuum to 0.76 I.V. and then air dried and injection molded into 27 gram preforms and blown into 500 ml bottles. Hunter haze on the bottles as measured through the sidewall was 18 percent.

2. The second set was made in a manner similar to Series 3A 1. The difference being that the core contained 0.35 weight percent PMDA. These pellets were solid phase polymerized to 0.81 I.V. (I.D6-3B1-08) then air dried and injection molded into 27 gram preforms and blown into 500 ml bottles. Hunter haze on the bottles as measured through the sidewall was 9.7 percent.

Series 3B 1 & 2. PET Modified with Cyclohexanedimethanol (CHDM); with and without PMDA.

1. In this two sets of experiments, a compartmentalized pellet was made using the polyester of Example 1B as the sheath. The core was 15 percent by weight of the pellet and contained 33.33 weight percent of the polyamide of example 1A and 66.67 weight of a 0.67 I.V. polyester modified with cyclohexanedimethanol (PETG Grade 6763 from Eastman Chemical Company, USA). The pellet was then solid phase polymerized under vacuum to 0.66 I.V. and then air dried and injection molded into 27 gram preforms and blown into 500 ml bottles. Hunter haze on the bottles as measured through the sidewall was 13.3 percent.

2. The second set was made in a manner similar to 3B2. The difference being that the core contained 0.35 weight percent PMDA and the polyamide and other polyester adjusted accordingly. These pellets were solid phase polymerized to 0.79 I.V. then air dried and injection molded into 27 gram preforms and blown into 500 ml bottles. Hunter haze on the bottles as measured through the sidewall was 10.7 percent.

Example 4

Polyester Sheath and Core of a Polyamide and Polyester

In 4A, control compartmentalized pellets were made by placing of the 95 percent by weight of the pellet of the polyethylene terephthalate copolymer of example 1B into the sheath and 5 percent by weight of the pellet of MXD6 (Grade 6007 from Mitsubishi Gas Chemical, Japan) into the core.

In 4B, 90 percent by weight of the pellet of the copolyethylene terephthalate was placed into the sheath and the core contained 5 percent by weight of the pellet of MXD6 (Grade 6007 from Mitsubishi Gas Chemical, Japan) blended with 5 percent by weight of the pellet of the polyethylene terephthalate copolymer. The ratio of PET in the core to the MXD6 in the core was 1:1.

In 4C, 85 percent by weight of the pellet of the copolyethylene terephthalate was placed into the sheath and the core contained 5 percent by weight of the pellet of MXD6 (Grade 6007 from Mitsubishi Gas Chemical, Japan) blended with 10 percent by weight of the pellet of the polyethylene terephthalate copolymer. The ratio of PET in the core to the MXD6 in the core was 3:1.

4A, 4B and 4C were thermally processed for 12 hours in rotating vacuum blenders at 230° C. and <1 mmHg. The resins were then dried in air at 300° F. for approximately 17 hours and injected into 27 gram preforms and blown into 0.5 L bottles. The data in Table III show only a slight, compromise in color.

TABLE III

Preform Color Measurements

| Construction | Preform L* | Preform a* | Preform b* | 0.5 L bottle b* |
|---|---|---|---|---|
| 4A 95% Sheath: PET, 5% Core: MXD6:PET Ratio: 1:0 | 38.5 | −0.9 | −0.53 | 6.13 |
| 4B 90% Sheath: PET, 10% Core: MXD6:PET Ratio: 1:1 | 39.1 | −1.16 | −1.16 | 13.5 |
| 4C 85% Sheath: PET, 15% Core: 5% MXD6:PET Ratio: 1:3 | 43.9 | −0.86 | 4.84 | 13.63 |

Example 5

Compartmentalized Oxygen Sensitive Components

This series of experiments demonstrates the functionality of keeping the oxygen promoter away from the oxygen sensitive component.

In 5A, (control sample), compartmentalized pellets were made by placing 95 percent by weight of the pellet of copolyethylene terephthalate (oxygen inert component) of example 1B into the sheath and 5 percent by weight of the pellet of MXD6 (Grade 6007 from Mitsubishi Gas Chemical, Japan) into the core.

In 5B, the comparative example, a comparative example pellet was manufactured by homogeneously dispersing approximately 95 percent by weight of the pellet of the polyethylene terephthalate copolymer, approximately 5% by weight of the pellet of MXD6 (Grade 6007 from Mitsubishi Gas Chemical, Japan), and 125 parts per million of cobalt neodecanoate (Shepherd Chemical, 20.5%) The specific weights were 5396 grams of polyethylene terephthalate copolymer (oxygen inert component), 284 grams of MXD6 (oxygen sensitive component) and 0.71 grams of ground Cobalt neodecanoate pastilles (promoter).

In 5C, the working example, compartmentalized pellets were made by placing approximately 95 percent by weight of the pellet of copolyethylene terephthalate of example 1B and 125 parts per million by weight of the pellet of ground Cobalt Neodecanoate pastilles into the sheath and approximately 5 percent by weight of the pellet of MXD6 (Grade 6007 from Mitsubishi Gas Chemical, Japan) into the core.

In 5D, the confirmatory example, the compartmentalized pellets of 5C were repelletized to mix the core and sheath together.

All the pellets were made to the same size and then analyzed for oxygen scavenging at room temperature by placing approximately 4 grams of pellets into the gas chromatograph vial, sealing the vial and the analyzing the amount of oxygen scavenged. Each vial was only analyzed once. The seven day scavenging results are shown in Table IV.

The test is highly variable at low levels of oxygen scavenging. Many polymers, in particular immediately after pelletizing, measure a low reactivity with oxygen which does not increase with time. For example, in 5A, the system is non-reactive (no cobalt) and the one day sample showed 0.0104 cc while the seven day sample showed 0.0009 cc of oxygen reacted. The lack of oxygen reactivity of the invention (5C) is demonstrated by the low reactivity of day one which is similar to the control and no increase in oxygen consumption from day one to day seven. The confirmatory example showed similar low reactivity at day one, but a marked increase in oxygen consumption after seven days, indicating that the materials are reactive once combined in a homogeneous dispersion.

TABLE IV

OXYGEN SCAVENGING STRUCTURE

| Construction | | cc O2 reacted per gram of pellets in 1 day | cc O2 reacted per gram of pellets in 7 days |
|---|---|---|---|
| 5A Control | Sheath: 95% PET Core: 5% MXD6 | 0.0104 | 0.0009 |
| 5B Comparative | homogenous dispersion of 95% PET, 5% MXD6, 125 ppm Co Neodecanoate | | 0.0210 |
| 5C Working Example | Sheath: 95% PET, 125 ppm Co Neodecanoate Core: 5% MXD6 | 0.0113 | 0.0130 |
| 5D Confirmatory Example - (5C repelletized) | Repelletized 5C homogenous dispersion of 95% PET, 5% MXD6, 125 ppm Co Neodecanoate | 0.0114 | 0.0346 |

We claim:

1. A resin pellet comprising an oxygen sensitive component, an oxygen inert component and a reaction promoter wherein the oxygen sensitive component is present in a first compartmentalized zone, the oxygen inert component is present in a second compartmentalized zone, wherein the second compartmentalized zone is a sheath and the first compartmentalized zone is a core.

2. A resin pellet as specified in claim 1 wherein the oxygen inert component comprises a thermoplastic polyester.

3. A resin pellet of claim 2 wherein the core is encapsulated by the sheath.

4. A resin pellet as specified in claim 2 wherein the oxygen sensitive component comprises an oxidizable organic compound.

5. A resin pellet as specified in claim 4 wherein the reaction promoter is a transition metal.

6. A resin pellet as specified in claim 5 wherein the transition metal is in the form of a transition metal salt and/or a transition metal oxide.

7. A resin pellet as specified in claim 5 wherein the transition metal is selected from the group consisting of cobalt, iron, manganese, and nickel.

8. A resin pellet as specified in claim 5 wherein the transition metal is cobalt.

9. A resin pellet as specified in claim 4 wherein the oxygen sensitive component contains at least one compound selected from the group consisting of polybutadiene, functionalized polybutadiene, unhydrogenated polybutadiene oligomers, polypropylene oxide oligomers and methyl pendant aromatic compounds.

10. A resin pellet as specified in claim 9 wherein the core is encapsulated by the sheath.

11. A resin pellet as specified in claim 9 wherein the reaction promoter is a transition metal.

12. A resin pellet as specified in claim 11 wherein the transition metal is in the form of a transition metal salt and/or a transition metal oxide.

13. A resin pellet as specified in claim 11 wherein the transition metal is selected from the group consisting of cobalt, iron, manganese, and nickel.

14. A resin pellet as specified in claim 11 wherein the transition metal is cobalt.

15. A resin pellet as specified in claim 4 wherein the oxygen sensitive component contains at least one compound selected from the group consisting of polybutadiene and functionalized polybutadiene.

16. A resin pellet as specified in claim 15 wherein the core is encapsulated by the sheath.

17. A resin pellet as specified in claim 15 wherein the reaction promoter is a transition metal.

18. A resin pellet as specified in claim 17 wherein the transition metal is in the form of a transition metal salt and/or a transition metal oxide.

19. A resin pellet as specified in claim 17 wherein the transition metal is selected from the group consisting of cobalt, iron, manganese, and nickel.

20. A resin pellet as specified in claim 17 wherein the transition metal is cobalt.

21. A resin pellet as specified in claim 4 wherein the oxidizable organic component comprises a polyamide which is the reaction product of a residue of dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof and a residue of a diamine comprising m-xylylene diamine, p-xylylene diamine, hexamethylene diamine, ethylene diamine, or 1,4 cyclohexanedimethylamine, or a mixture thereof.

22. A resin pellet as specified in claim 21 wherein the reaction promoter is a transition metal.

23. A resin pellet as specified in claim 22 wherein the transition metal is in the form of a transition metal salt and/or a transition metal oxide.

24. A resin pellet as specified in claim 22 wherein the transition metal is selected from the group consisting of cobalt, iron, manganese, and nickel.

25. A resin pellet as specified in claim 22 wherein the transition metal is cobalt.

26. A resin pellet as specified in claim 21 wherein the oxidizable organic component is MXD-6 nylon.

27. A resin pellet as specified in claim 26 wherein the core is encapsulated by the sheath.

28. A resin pellet as specified in claim 26 wherein the reaction promoter is a transition metal.

29. A resin pellet as specified in claim 28 wherein the transition metal is in the form of a transition metal salt and/or a transition metal oxide.

30. A resin pellet as specified in claim 28 wherein the transition metal is selected from the group consisting of cobalt, iron, manganese, and nickel.

31. A resin pellet as specified in claim 28 wherein the transition metal is cobalt.

32. A resin pellet as specified in claim 2 wherein the thermoplastic polyester is polyethylene terephthalate or a copolymer of polyethylene terephthalate.

33. A resin pellet as specified in claim 32 wherein the core is encapsulated by the sheath.

34. A resin pellet as specified in claim 32 wherein the reaction promoter is a transition metal.

35. A resin pellet as specified in claim 34 wherein the transition metal is in the form of a transition metal salt and/or a transition metal oxide.

36. A resin pellet as specified in claim 34 wherein the transition metal is selected from the group consisting of cobalt, iron, manganese, and nickel.

37. A resin pellet as specified in claim 34 wherein the transition metal is cobalt.

38. A resin pellet as specified in claim 32 wherein the oxygen sensitive component comprises an oxidizable organic compound.

39. A resin pellet as specified in claim 38 wherein the reaction promoter is a transition metal.

40. A resin pellet as specified in claim 39 wherein the transition metal is in the form of a transition metal salt and/or a transition metal oxide.

41. A resin pellet as specified in claim 39 wherein the transition metal is selected from the group consisting of cobalt, iron, manganese, and nickel.

42. A resin pellet as specified in claim 39 wherein the transition metal is cobalt.

43. A resin pellet as specified in claim 32 wherein the oxygen sensitive component contains at least one compound selected from the group consisting of polybutadiene, functionalized polybutadiene, unhydrogenated polybutadiene oligomers, polypropylene oxide oligomers and methyl pendant aromatic compounds.

44. A resin pellet as specified in claim 43 wherein the core is encapsulated by the sheath.

45. A resin pellet as specified in claim 43 wherein the reaction promoter is a transition metal.

46. A resin pellet as specified in claim 45 wherein the transition metal is in the form of a transition metal salt and/or a transition metal oxide.

47. A resin pellet as specified in claim 45 wherein the transition metal is selected from the group consisting of cobalt, iron, manganese, and nickel.

48. A resin pellet as specified in claim 45 wherein the transition metal is cobalt.

49. A resin pellet as specified in claim 32 wherein the oxygen sensitive component contains at least one compound selected from the group consisting of polybutadiene and functionalized polybutadiene.

50. A resin pellet as specified in claim 49 wherein the core is encapsulated by the sheath.

51. A resin pellet as specified in claim 49 wherein the reaction promoter is a transition metal.

52. A resin pellet as specified in claim 51 wherein the transition metal is in the form of a transition metal salt and/or a transition metal oxide.

53. A resin pellet as specified in claim 51 wherein the transition metal is selected from the group consisting of cobalt, iron, manganese, and nickel.

54. A resin pellet as specified in claim 51 wherein the transition metal is cobalt.

55. A resin pellet as specified in claim 32 wherein the oxidizable organic component comprises a polyamide which is the reaction product of a residue of dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof and a residue of a diamine comprising m-xylylene diamine, p-xylylene diamine, hexamethylene diamine, ethylene diamine, or 1,4 cyclohexanedimethylamine, or a mixture thereof.

56. A resin pellet as specified in claim 55 wherein the reaction promoter is a transition metal.

57. A resin pellet as specified in claim 56 wherein the transition metal is in the form of a transition metal salt and/or a transition metal oxide.

58. A resin pellet as specified in claim 56 wherein the transition metal is selected from the group consisting of cobalt, iron, manganese, and nickel.

59. A resin pellet as specified in claim 56 wherein the transition metal is cobalt.

60. A resin pellet as specified in claim 32 wherein the oxidizable organic component is MXD-6 nylon.

61. A resin pellet as specified in claim 60 wherein the core is encapsulated by the sheath.

62. A resin pellet as specified in claim 60 wherein the reaction promoter is a transition metal.

63. A resin pellet as specified in claim 62 wherein the transition metal is in the form of a transition metal salt and/or a transition metal oxide.

64. A resin pellet as specified in claim 62 wherein the transition metal is selected from the group consisting of cobalt, iron, manganese, and nickel.

65. A resin pellet as specified in claim 62 wherein the transition metal is cobalt.

66. A resin pellet as specified in claim 32 wherein the oxygen sensitive component is the reaction product of predominately polycondensate segments selected from the group consisting of polyesters as recited in USA 21 CFR 177.1590 and polyamides with a minor amount of oxygen sensitive moiety segments selected from the group consisting of functionalized polybutadiene, unhydrogenated polybutadiene oligomers, polypropylene oxide oligomers and methyl pendant aromatic compounds.

67. A resin pellet as specified in claim 66 wherein the core is encapsulated by the sheath.

68. A resin pellet as specified in claim 66 wherein the reaction promoter is a transition metal.

69. A resin pellet as specified in claim 68 wherein the transition metal is in the form of a transition metal salt and/or a transition metal oxide.

70. A resin pellet as specified in claim 68 wherein the transition metal is cobalt.

71. A resin pellet comprising a first component and a second component wherein the first component releases a by-product during thermal processing that is reactive with either the second component and/or a by-product released by the second component, wherein the first component is present in a first compartmentalized zone wherein the second component is present in a second compartmentalized zone and the resin pellet is further comprised of a core and a sheath, wherein the sheath is comprised of the first component and wherein the core is comprised of the second component.

72. A resin pellet of claim 71 wherein the second component is encapsulated by the first component.

73. A resin pellet which is comprised of a first compartmentalized zone and a second compartmentalized zone, wherein the first compartmentalized zone is comprised of a thermoplastic polyester, the second compartmentalized zone is comprised of a polyamide, wherein the first compartmentalized zone represents at least 0.1 percent of the total volume of the resin pellet, wherein the second compartmentalized zone represents at least 0.1 percent of the total volume of the resin pellet and wherein the second compartmentalized zone is in the form of a core and the first compartmentalized zone is in the form of a sheath.

74. A resin pellet of claim 73 wherein the second compartmentalized zone is encapsulated by the first compartmentalized zone.

75. A resin pellet as specified in claim 73 which is further comprised of a third compartmentalized zone which is comprised of a thermoplastic polyester wherein the second compartmentalized zone lies between the first and third compartmentalized zones.

76. A resin pellet of claim 73 wherein the thermoplastic polyester is poly-neopentyl-glycol terephthalate.

77. A resin pellet or claim 76, wherein the pellet is further comprised of a third compartmentalized zone which contains a second thermoplastic polyester.

78. A resin pellet as specified in claim 75 wherein the polyamide is the reaction product of a residue of dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof and a residue of a diamine comprising m-xylylene diamine, p-xylylene diamine, hexamethylene diamine, ethylene diamine, or 1,4 cyclohexanedimethylamine, or a mixture thereof.

79. A resin pellet as specified in claim 78 wherein the polyamide is a MXD-6 nylon.

80. A resin pellet as specified in claim 73 wherein the thermoplastic polyester is polyethylene terephthalate or polyethylene terephthalate copolymer.

81. A resin pellet as specified in claim 73 wherein the polyamide is a MXD-6 nylon and wherein the thermoplastic polyester is polyethylene terephthalate or polyethylene terephthalate copolymer.

82. A resin pellet as specified in claim 74 wherein the polyamide is a MXD-6 nylon and wherein the thermoplastic polyester is polyethylene terephthalate or polyethylene terephthalate copolymer.

83. A resin pellet as specified in claim 81, wherein the intrinsic viscosity of the polyethylene terephthalate or polyethylene terephthalate copolymer is at least 0.49 dl/gm.

84. A resin pellet as specified in claim 82, wherein the intrinsic viscosity of the polyethylene terephthalate or polyethylene terephthalate copolymer is at least 0.49 dl/gm.

85. A resin pellet as specified in claim 81, wherein the intrinsic viscosity of the polyethylene terephthalate or polyethylene terephthalate copolymer is at least 0.59 dl/gm.

86. A resin pellet as specified in claim 82, wherein the intrinsic viscosity of the polyethylene terephthalate or polyethylene terephthalate copolymer is at least 0.59 dl/gm.

87. A resin pellet as specified in claim 81 wherein the core is further comprised of a thermoplastic polyester.

88. A resin pellet as specified in claim 87 wherein the thermoplastic polyester in the core is present as the continuous phase.

89. A resin pellet as specified in claim 82 wherein the core is further comprised of a thermoplastic polyester.

90. A resin pellet as specified in claim 89 wherein the thermoplastic polyester in the core is present as the continuous phase.

91. A resin pellet of claim 87 wherein the thermoplastic polyester present in the core includes a recycled thermoplastic polyester.

92. A resin pellet of claim 89 wherein the thermoplastic polyester present in the core includes a recycled thermoplastic polyester.

93. A resin pellet of claim 83 wherein the pellet further comprises a compatibilizer selected from the group consisted of cyclohexane dimethanol modified polyesters and ionic compatibilizers.

94. A resin pellet of claim 84 wherein the pellet further comprises a compatibilizer selected from the group consisted of cyclohexane dimethanol modified polyesters and ionic compatibilizers.

95. A resin pellet of claim 85 wherein the pellet further comprises a compatibilizer selected from the group consisted of cyclohexane dimethanol modified polyesters and ionic compatibilizers.

96. A resin pellet as specified in claim 93 wherein the second compartmentalized zone is in the form of a core and the first compartmentalized zone is in the form of a sheath and the first component is the first compartmentalized zone and the second component is in the second compartmentalized zone.

97. A resin pellet of claim 86 wherein the pellet further comprises a compatibilizer selected from the group consisted of cyclohexane dimethanol modified polyesters and ionic compatibilizers.

98. A resin pellet comprising an oxygen reactive component and an oxygen inert component, wherein the oxygen reactive component is present in a first compartmentalized zone, and wherein the oxygen inert component is present in a second compartmentalized zone and wherein the second compartmentalized zone is a sheath and the first compartmentalized zone is a core.

99. A resin pellet as specified in claim 98 wherein the oxygen inert component is comprised of a thermoplastic polyester.

100. A resin pellet of claim 98 wherein the core is encapsulated by the sheath.

101. A resin pellet as specified in claim 99 wherein the oxygen reactive component is comprised of an oxidizable organic compound.

102. A resin pellet as specified in claim 99 wherein the oxygen reactive component contains at least one compound selected from the group consisting of polybutadiene, functionalized polybutadiene, unhydrogenated polybutadiene oligomers, polypropylene oxide oligomers and methyl pendant aromatic compounds.

103. A resin pellet as specified in claim 102 wherein the second compartmentalized zone is a sheath and the first compartmentalized zone is a core.

104. A resin pellet as specified in claim 99 wherein the core is encapsulated by the sheath.

105. A resin pellet as specified in claim 99 wherein the oxygen reactive component contains at least one compound selected from the group consisting of polybutadiene and functionalized polybutadiene.

106. A resin pellet as specified in claim 105 wherein the core is encapsulated by the sheath.

107. A resin pellet as specified in claim 99 wherein the oxygen reactive component is a polyamide which is the reaction product of a residue of dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof and a residue of a diamine comprising m-xylylene diamine, p-xylylene diamine, hexamethylene diamine, ethylene diamine, or 1,4 cyclohexanedimethylamine, or a mixture thereof.

108. A resin pellet as specified in claim 107 wherein the oxygen reactive component is MXD-6 nylon.

109. A resin pellet as specified in claim 108 wherein the core is encapsulated by the sheath.

110. A resin pellet as specified in claim 99 wherein the thermoplastic polyester is polyethylene terephthalate or a copolymer of polyethylene terephthalate.

111. A resin pellet as specified in claim 110 wherein the core is encapsulated by the sheath.

112. A resin pellet as specified in claim 110 wherein the oxygen reactive component comprises an oxidizable organic compound.

113. A resin pellet as specified in claim 112 wherein the oxygen reactive component contains at least one compound selected from the group consisting of polybutadiene, functionalized polybutadiene, unhydrogenated polybutadiene oligomers, polypropylene oxide oligomers and methyl pendant aromatic compounds.

114. A resin pellet as specified in claim 81, wherein the intrinsic viscosity of the polyethylene terephthalate or polyethylene terephthalate copolymer is at least 0.72 dl/gm.

115. A resin pellet as specified in claim 82, wherein the intrinsic viscosity of the polyethylene terephthalate or polyethylene terephthalate copolymer is at least 0.72 dl/gm.

116. A resin pellet of claim 114 wherein the pellet further comprises a compatibilizer selected from the group consisted of cyclohexane dimethanol modified polyesters and ionic compatibilizers.

117. A resin pellet of claim 115 wherein the pellet further comprises a compatibilizer selected from the group consisted of cyclohexane dimethanol modified polyesters and ionic compatibilizers.

118. A resin pellet as specified in claim 110 wherein the oxygen reactive component is a polyamide which is the reaction product of a residue of dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof and a residue of a diamine comprising m-xylylene diamine, p-xylylene diamine, hexamethylene diamine, ethylene diamine, or 1,4 cyclohexanedimethylamine, or a mixture thereof.

119. A resin pellet as specified in claim 118 wherein the oxygen reactive component is MXD-6 nylon.

120. A resin pellet as specified in claim 110 wherein the oxygen reactive component is the reaction product of predominately polycondensate segments selected from the group consisting of polyesters as recited in USA 21 CFR 177.1590 and polyamides with a minor amount oxygen reactive moiety segments selected from the group consisting of polybutadiene monomer, unhydrogenated polybutadiene oligomers, polypropylene oxide oligomers and methyl pendant aromatic compounds.

121. A resin pellet as specified in claim 111 wherein the oxygen reactive component is the reaction product of predominately polycondensate segments selected from the group consisting of polyesters as recited in USA 21 CFR 177.1590 and polyamides with a minor amount oxygen reactive moiety segments selected from the group consisting of polybutadiene monomer, unhydrogenated polybutadiene oligomers, polypropylene oxide oligomers and methyl pendant aromatic compounds.

122. A resin pellet comprising a first component and a second component wherein the first component is selected from the group consisting of an oxygen sensitive compound, an oxygen reactive compound, an oxygen inert compound, a reaction promoter; a compound which releases a by-product during thermal processing that is reactive with either the second component and/or a by-product released by the second component, and a second component which is different from the first component and which is selected from the group consisting of an oxygen sensitive compound, an oxygen reactive compound, an oxygen inert compound, a reaction promoter, a compound which releases a by-product during thermal processing that is reactive with either the first component and/or a by-product released by the first component and wherein the first component is present in a first compartmentalized zone wherein the second component is present in a second compartmentalized zone and the resin pellet is further comprised of a core and a sheath.

123. A process for thermally treating a resin pellet comprising heating the resin pellet specified in claim 122 to a temperature which is within the range of 40° C. to a temperature which is at least 1° C. below the temperature at which the pellet becomes liquid.

124. The process of claim 123, wherein the thermal treatment comprises exposing the pellet to a temperature which is within the range of 70° C. to a temperature which is at least 5° C. below the temperature at which the pellet becomes liquid.

125. The process of claim 124, wherein the resin pellet is thermally processed in the temperature range for a time sufficient to increase the crystallinity of the first component or second component by at least 5 percent.

126. The process of claim 124, wherein the first component is a first thermoplastic resin and the second component is a second thermoplastic resin and the pellet is thermally processed in the temperature range for sufficient time so that the increase in crystallinity of the first component added to the increase in crystallinity of the second components is at least 5 percent.

127. The process of claim 124, wherein the resin pellet has moisture prior to thermal processing, and the resin pellet is thermally processed in the temperature range for sufficient time to remove at least one-half of the moisture present prior to thermal processing.

128. The process of claim 126, wherein at least one of the thermoplastic resins has an I.V. of at least 0.2 dl/g prior to thermal treatment and wherein the resin pellet is thermally treated in the temperature range for sufficient time to increase the I.V. of the thermoplastic resin with an I.V. of at least 0.2 dl/g prior to thermal treatment by at least 0.1 dl/g.

129. The process of claim 123, wherein the sheath is comprised of the first component and the first component is a polyester selected from the group consisting of polyethylene terephthalate and crystallizable copolyethylene terephthalate.

130. The process of claim 129, wherein the thermal treatment comprises exposing the pellet to a temperature between 70° C. and a temperature which is 5° C. less than the crystalline melting point of the polyester.

131. The process of claim 129, wherein the resin pellet is thermally processed in the temperature range for a time sufficient to increase the crystallinity of the first component or second component by at least 5 percent.

132. The process of claim 124, wherein the second component is a second thermoplastic resin and the pellet is thermally processed in the temperature range for sufficient time so that the increase in crystallinity of the first component added to the increase in crystallinity of the second component is at least 5 percent.

133. The process of claim 129, wherein the resin pellet has moisture prior to thermal processing, and the resin pellet is thermally processed in the temperature range for sufficient time to remove at least one-half of the moisture present prior to thermal processing.

134. The process of claim 129, wherein at least one of the first or second components has an I.V. of at least 0.2 dl/g prior to thermal treatment and wherein the resin pellet is thermally treated in the temperature range for sufficient time to increase the I.V. of the component with an I.V. of at least 0.2 dl/g prior to thermal treatment by at least 0.1 dl/g.

135. The process of claim 129 wherein the core comprises the second component and the second component is a polyamide.

136. The process of claim 129, wherein the thermal treatment comprises exposing the pellet to a temperature between 70° C. and a temperature which is 5° C. less than the crystalline melting point of the polyester.

137. The process of claim 129, wherein the resin pellet is thermally processed in the temperature range for a time sufficient to increase the crystallinity of the first component or second component by at least 5 percent.

138. The process of claim 124, wherein the second component is a second thermoplastic resin and the pellet is thermally processed in the temperature range for sufficient time so that the increase in crystallinity of the first component added to the increase in crystallinity of the second component is at least 5 percent.

139. The process of claim 129, wherein the resin pellet has moisture prior to thermal processing, and the resin pellet is thermally processed in the temperature range for sufficient time to remove at least one-half of the moisture present prior to thermal processing.

140. The process of claim 129, wherein at least one of the first or second components has an I.V. of at least 0.2 dl/g prior to thermal treatment and wherein the resin pellet is thermally treated in the temperature range for sufficient time to increase the I.V. of the component with an I.V. of at least 0.2 dl/g prior to thermal treatment by at least 0.1 dl/g.

141. The process of claim 135, wherein the polyamide comprises the a residue of the repeating unit A-D, wherein A is the residue of a dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof, and B is a residue of a diamine comprising m-xylylene diamine, p-xylylene diamine, hexamethylene diamine, ethylene diamine, or 1,4 cyclohexanedimethylamine, or a mixture thereof.

142. The process of claim 129, wherein the thermal treatment comprises exposing the pellet to a temperature between 70° C. and a temperature which is 5° C. less than the crystalline melting point of the polyester.

143. The process of claim 129, wherein the resin pellet is thermally processed in the temperature range for a time sufficient to increase the crystallinity of the first component or second component by at least 5 percent.

144. The process of claim 129, wherein the second component is a second thermoplastic resin and the pellet is thermally processed in the temperature range for sufficient time so that the increase in crystallinity of the first component added to the increase in crystallinity of the second component is at least 5 percent.

145. The process of claim 129, wherein the resin pellet has moisture prior to thermal processing, and the resin pellet is thermally processed in the temperature range for sufficient time to remove at least one-half of the moisture present prior to thermal processing.

146. The process of claim 129, wherein at least one of the first or second components has an I.V. of at least 0.2 dl/g prior to thermal treatment and wherein the resin pellet is thermally treated in the temperature range for sufficient time to increase the I.V. of the component with an I.V. of at least 0.2 dl/g prior to thermal treatment by at least 0.1 dl/g.

147. The process of claim 135, wherein the polyamide MXD-6 nylon.

148. The process of claim 129, wherein the thermal treatment comprises exposing the pellet to a temperature between 70° C. and a temperature which is 5° C. less than the crystalline melting point of the polyester.

149. The process of claim 129, wherein the resin pellet is thermally processed in the temperature range for a time sufficient to increase the crystallinity of the first component or second component by at least 5 percent.

150. The process of claim 124, wherein the second component is a second thermoplastic resin and the pellet is thermally processed in the temperature range for sufficient time so that the increase in crystallinity of the first component added to the increase in crystallinity of the second component is at least 5 percent.

151. The process of claim 129, wherein the resin pellet has moisture prior to thermal processing, and the resin pellet is thermally processed in the temperature range for sufficient time to remove at least one-half of the moisture present prior to thermal processing.

152. The process of claim 129, wherein at least one of the first or second components has an I.V. of at least 0.2 dl/g prior to thermal treatment and wherein the resin pellet is thermally treated in the temperature range for sufficient time to increase the I.V. of the component with an I.V. of at least 0.2 dl/g prior to thermal treatment by at least 0.1 dl/g.

153. The process of claim 129, wherein the thermal treatment comprises exposing the pellet to a temperature between 70° C. and a temperature which is 5° C. less than the crystalline melting point of the polyester.

154. The process of claim 129, wherein the resin pellet is thermally processed in the temperature range for a time sufficient to increase the crystallinity of the first component or second component by at least 5 percent.

155. The process of claim 124, wherein the second component is a second thermoplastic resin and the pellet is thermally processed in the temperature range for sufficient time so that the increase in crystallinity of the first component added to the increase in crystallinity of the second component is at least 5 percent.

156. The process of claim 129, wherein the resin pellet has moisture prior to thermal processing, and the resin pellet is thermally processed in the temperature range for sufficient time to remove at least one-half of the moisture present prior to thermal processing.

157. The process of claim 129, wherein at least one of the first or second components has an I.V. of at least 0.2 dl/g prior to thermal treatment and wherein the resin pellet is thermally treated in the temperature range for sufficient time to increase the I.V. of the component with an I.V. of at least 0.2 dl/g prior to thermal treatment by at least 0.1 dl/g.

158. A resin pellet as specified in claim 71 wherein the first component is polyethylene terephthalate or a copolymer of polyethylene terephthalate and the second component reacts with or catalyzes a reaction with acetaldehyde at room temperature.

159. The pellet of claim 158 wherein the second component is selected from the group consisting of heteroatom containing organic compounds that can react with acetaldehyde to form unbridged 5- or 6- member rings, active oxidation catalysts that catalyze the reaction of acetaldehyde with oxygen, and hydride-transfer catalysts that catalyze a hydride-transfer reaction between an organic donor molecule and acetaldehyde.

160. The pellet of claim 159 wherein the heteroatom containing organic compound is selected from the group consisting of 1,8-diaminonaphthalene, 3,4-diaminobenzoic acid, anthranilamide, biuret, malonamide, allantoin, salicyclamide, salicylanilide, o-phenylenediamine, 3,4-diaminobenzoic acid, 1,8-diaminonaphthalene, o-mercaptobenzamide, N-acetylglycinamide, malonamide, 3-mercapto- 1,2-propanediol, 4-amino-3-hydroxybenzoic acid, 4, 5-dihydroxy-2, 7-naphthalenedisulfonic acid disodium salt, biuret, 2,3-diaminopyridine, 1,2-diaminoanthraquinone, dianilinoethane, allantoin, 2-aminobenzenesulfonamide, and 2-amino-2-methyl- 1,3 -propanediol.

161. The pellet of claim 159 wherein the active oxidation catalyst is selected from the group consisting of cobalt salt, manganese salt, and a compound comprising an amine, a phosphine or an alcohol complexed with a variable valent metal.

162. The pellet of claim 159 wherein the hydride transfer catalyst is 25 selected from the group consisting of hydrous zirconium oxide, hydrous niobium oxide, and hydrous tantalum oxide.

163. The pellet of claim 80 wherein the thermoplastic polyester is void of strain induced crystallinity.

164. The pellet of claim 80 wherein the thermoplastic polyester has at least 10% non-strain induced crystallinity.

165. The pellet of claim 81 wherein the thermoplastic polyester is void of strain induced crystallinity.

166. The pellet of claim 81 wherein the thermoplastic polyester has at least 10% non-strain induced crystallinity.

167. The pellet of claim 82 wherein the thermoplastic polyester is void of strain induced crystallinity.

168. The pellet of claim 82 wherein the thermoplastic polyester has at least 10% non-strain induced crystallinity.

* * * * *